US012672179B2

(12) United States Patent
Jiang et al.

(10) Patent No.: US 12,672,179 B2
(45) Date of Patent: Jun. 30, 2026

(54) COMMUNICATION METHOD AND COMMUNICATION APPARATUS

(71) Applicant: Huawei Technologies Co., Ltd., Shenzhen (CN)

(72) Inventors: Chengkun Jiang, Shanghai (CN); Han Zhou, Shanghai (CN); Hancheng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 241 days.

(21) Appl. No.: 18/472,805

(22) Filed: Sep. 22, 2023

(65) Prior Publication Data

US 2024/0015816 A1     Jan. 11, 2024

Related U.S. Application Data

(63) Continuation of application No. PCT/CN2022/076202, filed on Feb. 14, 2022.

(30) Foreign Application Priority Data

Mar. 26, 2021    (CN) .......................... 202110332537.8

(51) Int. Cl.
*H04W 76/12* (2018.01)
*H04W 24/04* (2009.01)

(52) U.S. Cl.
CPC ........... *H04W 76/12* (2018.02); *H04W 24/04* (2013.01)

(58) Field of Classification Search
CPC ..... H04W 76/11; H04W 36/00; H04W 24/04; H04W 76/12; H04W 76/15
See application file for complete search history.

(56) References Cited

U.S. PATENT DOCUMENTS

| | | | | |
|---|---|---|---|---|
| 2019/0149365 A1* | 5/2019 | Chatterjee | ............. | H04W 76/11 370/329 |
| 2021/0136863 A1* | 5/2021 | Park | ....................... | H04W 76/27 |
| 2022/0264338 A1* | 8/2022 | Park | ....................... | H04W 92/18 |
| 2023/0164536 A1* | 5/2023 | Back | ..................... | H04W 8/005 370/329 |

(Continued)

FOREIGN PATENT DOCUMENTS

| | | |
|---|---|---|
| CN | 111757553 A | 10/2020 |
| CN | 112005566 A | 11/2020 |

*Primary Examiner* — Syed Ali
(74) *Attorney, Agent, or Firm* — Slater Matsil, LLP

(57) ABSTRACT

A session management network element determines whether a first communication apparatus and a second communication apparatus have a redundancy functionality, receives a session establishment request message from a first terminal device, to request to establish a first session between the first terminal device and a data network. When both the first communication apparatus and the second communication apparatus have the redundancy functionality, and the first session is a redundant session, selects a first user plane function network element to establish the first session, where the second user plane function network element is configured to establish a second session, the first session is a redundant session of the second session, and the first session and the second session are for communication between the first communication apparatus and the second communication apparatus.

20 Claims, 11 Drawing Sheets

(56) References Cited

U.S. PATENT DOCUMENTS

| | | | |
|---|---|---|---|
| 2023/0239174 A1* | 7/2023 | Miklós | H04W 28/0263 |
| | | | 370/254 |
| 2023/0309009 A1* | 9/2023 | Back | H04W 48/16 |
| 2024/0007925 A1* | 1/2024 | Li | H04W 76/15 |
| 2024/0107481 A1* | 3/2024 | Tiwari | H04W 76/15 |

* cited by examiner

300

305    306    307

AMF —N11— SMF —N7— PCF

N2

N4

UE — RAN — N3 tunnel 1 — UPF — N6 — DN
      N3 tunnel 2

301    302    303    304

400

407    408    409

AMF —N11— SMF —N7— PCF

N2

N3     N9

UE — RAN — N3 — I-UPF 1 — N9 tunnel 1 — UPF — N6 — DN
    tunnel 1     403     405     406

N3     N9

401    402    N3 tunnel 2 — I-UPF 2 — N9 tunnel 2
               404

600

1000

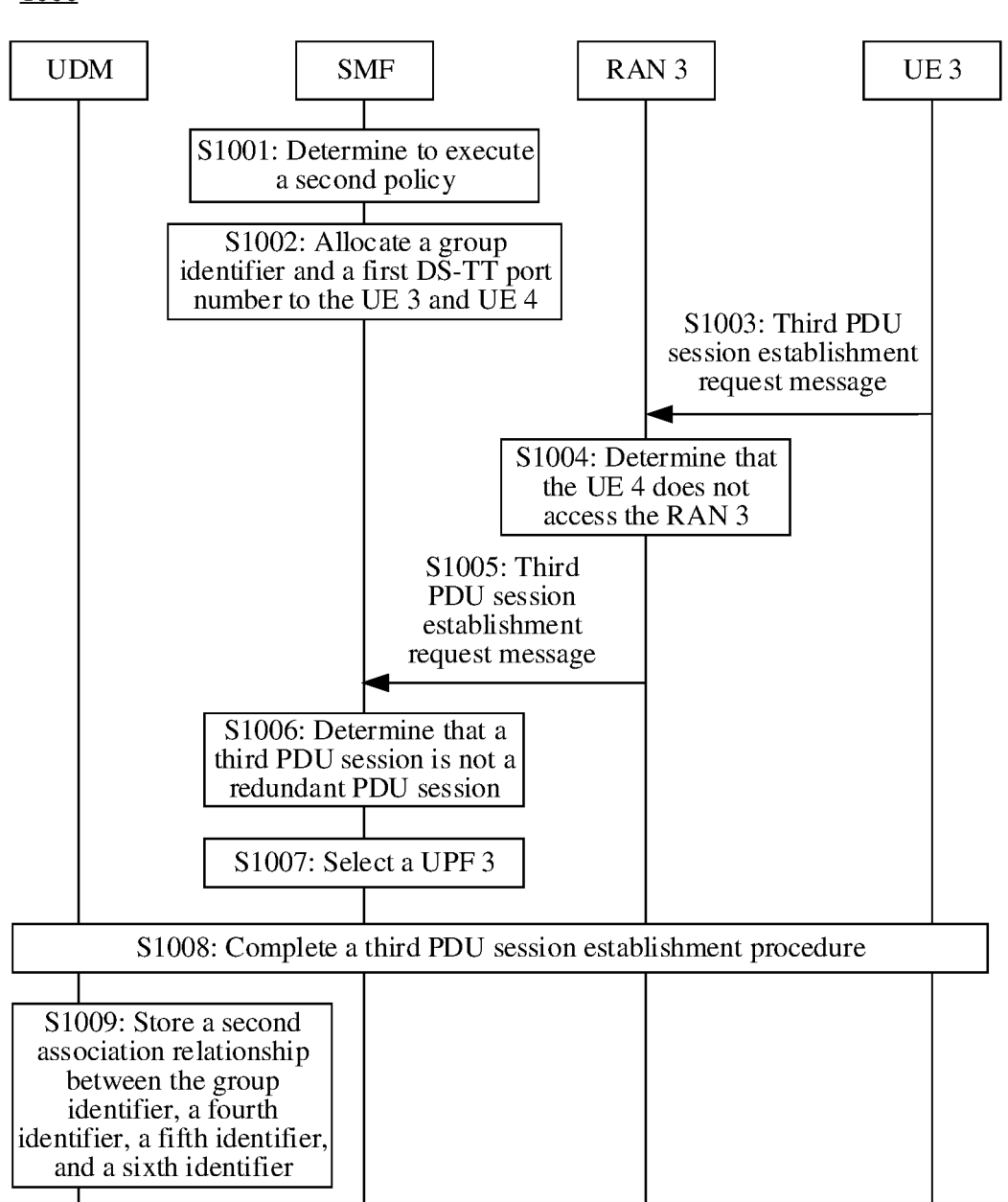

| UDM | SMF | RAN 3 | UE 3 |

S1001: Determine to execute a second policy

S1002: Allocate a group identifier and a first DS-TT port number to the UE 3 and UE 4

S1003: Third PDU session establishment request message

S1004: Determine that the UE 4 does not access the RAN 3

S1005: Third PDU session establishment request message

S1006: Determine that a third PDU session is not a redundant PDU session

S1007: Select a UPF 3

S1008: Complete a third PDU session establishment procedure

S1009: Store a second association relationship between the group identifier, a fourth identifier, a fifth identifier, and a sixth identifier

COMMUNICATION METHOD AND COMMUNICATION APPARATUS

CROSS-REFERENCE TO RELATED APPLICATIONS

This application is a continuation of International Application No. PCT/CN2022/076202, filed on Feb. 14, 2022, which claims priority to Chinese Patent Application No. 202110332537.8, filed on Mar. 26, 2021. The disclosures of the aforementioned applications are hereby incorporated by reference in their entireties.

TECHNICAL FIELD

This application relates to the communication field, and more specifically, to a communication method and a communication apparatus.

BACKGROUND

With development of technologies, a 3rd generation partnership project (3GPP) network (a wireless technology defined by a 3GPP standard group) begins to be applied to various fields, and some communication devices begin to implement interconnection and interworking through the 3GPP network. For example, industrial devices in the industrial Ethernet may implement wireless interconnection by accessing a 5th generation (5G) communication system.

However, when the communication devices implement a wireless connection through the 3GPP network, reliability is low, and service continuity is easily affected by network interruption. Therefore, a technology that can improve communication reliability needs to be provided.

SUMMARY

According to a communication method and a communication apparatus in embodiments of this application, reliability and continuity of communication between two communication apparatuses connected by using a 3GPP network can be improved.

According to a first aspect, a communication method is provided, and includes: A session management network element determines whether a first communication apparatus and a second communication apparatus have a redundancy functionality. The session management network element receives a session establishment request message from a first terminal device, where the session establishment request message is for requesting to establish a first session between the first terminal device and a data network. When both the first communication apparatus and the second communication apparatus have the redundancy functionality, and the first session is a redundant session, the session management network element selects a first user plane function network element to establish the first session, where the first user plane function network element is different from a second user plane function network element, the second user plane function network element is configured to establish a second session, the first session is a redundant session of the second session, and the first session and the second session are for communication between the first communication apparatus and the second communication apparatus.

It should be understood that, that one communication apparatus has a redundancy functionality indicates that the communication apparatus has a capability of performing redundancy backup on data, to be specific, can duplicate and deduplicate a data packet. For example, in an industrial network scenario, that an industrial device supports an industrial redundancy protocol, for example, a media redundancy protocol (media redundancy protocol, MRP) may indicate that the industrial device has a redundancy functionality.

It should be noted that both the first communication apparatus and the second communication apparatus may be deployed on a terminal device side, or one may be deployed on the terminal device side, and the other may be deployed on the data network. A communication apparatus deployed on the terminal device side accesses a network by using at least two terminal devices that are mutually redundant, to implement a connection to another communication apparatus. For example, in a possible implementation, the second communication apparatus is deployed on the terminal device side, and the second communication apparatus accesses the network by using the first terminal device and a second terminal device, to implement a connection to the first communication apparatus. The first session established by the first terminal device and the second session established by the second terminal device are for communication between the first communication apparatus and the second communication apparatus.

According to the communication method provided in this embodiment of this application, different user plane function network elements are allocated to the redundant session between two communication apparatuses that have the redundancy functionality, so that two independent redundant links can be established between the two communication apparatuses, and the two communication apparatuses can perform data transmission on the two redundant links. Data is backed up through the redundant link to ensure data reliability.

Optionally, the session establishment request message includes a first identifier, and the first identifier is associated with a second identifier. The first identifier identifies the first terminal device, the second identifier identifies the second terminal device, and the first terminal device and the second terminal device are mutually redundant.

That the first terminal device and the second terminal device are mutually redundant indicates that the first terminal device and the second terminal device are two terminal devices that are connected to a same communication apparatus or a same group of communication apparatuses and transmit same data through different links. To be specific, a communication apparatus or a group of communication apparatuses establish two different links by using the first terminal device and the second terminal device, and transmit same data through the two links.

That the first identifier is associated with the second identifier may indicate that there is an association relationship between the first terminal device and the second terminal device that are mutually redundant. For example, before the session management network element receives the session establishment request message from the first terminal device, the first terminal device and the second terminal device complete a network registration procedure, and the first terminal device and the second terminal device are bound to each other during network registration. For example, the first terminal device carries an identifier of the second terminal device when requesting to perform network registration, and the second terminal device carries an identifier of the first terminal device when requesting to perform network registration. After the first terminal device and the second terminal device complete network registration, a network device stores a redundancy relationship between the first identifier and the second identifier. For example, the network device stores a first mapping relationship between the first terminal device and the second terminal device. When the first terminal device carries the first identifier in the session establishment request message, the network device may determine the second terminal device based on the first identifier and the first mapping relationship.

With reference to the first aspect, in some implementations of the first aspect, the first communication apparatus is deployed on the data network. The method further includes: When the first communication apparatus does not have the redundancy functionality, and the first session is the redundant session, the session management network element selects the second user plane function network element to establish the first session.

According to the communication method in this embodiment of this application, when the first communication apparatus deployed on the data network does not have the redundancy functionality, a same user plane function network element is allocated to the redundant session between the first communication apparatus and the second communication apparatus, so that the network device may perform a redundancy proxy, to improve communication reliability.

With reference to the first aspect, in some implementations of the first aspect, the method further includes: When the second communication apparatus does not have the redundancy functionality, the session management network element allocates a first port to the first terminal device and the second terminal device, where the second communication apparatus is connected to the first terminal device through the first port, and the second communication apparatus is connected to the second terminal device through the first port.

According to the communication method in this embodiment of this application, when the second communication apparatus deployed on the terminal device side does not have the redundancy functionality, a same first port is allocated to the first terminal device and the second terminal device. Both the first terminal device and the second terminal device are connected to the second communication apparatus through the first port, so that the network device may provide the redundancy proxy through the first port, to improve the communication reliability.

With reference to the first aspect, in some implementations of the first aspect, the first port includes a DS-TT port.

With reference to the first aspect, in some implementations of the first aspect, the method further includes: The session management network element sends a first mapping relationship between the identifier of the first terminal device and an identifier of the first user plane function network element to a data management network element.

With reference to the first aspect, in some implementations of the first aspect, that the session management network element determines whether the first session is the redundant session includes: When a first data network name (DNN) is the same as a second DNN, first single network slice selection assistance information (S-NSSAI) is the same as second S-NSSAI, a first 5G quality of service identifier (5QI) is the same as a second 5QI, the first terminal device and the second terminal device are mutually redundant, and address information of the first terminal device is different from address information of the second terminal device, the session management network element determines that the first session is the redundant session, where the first DNN, the first S-NSSAI, and the first 5QI are associated with the first session, and the second DNN, the second S-NSSAI, and the second 5QI are associated with the second session.

To be specific, when the first terminal device requests the session management network element to establish the first session, the session management network element queries whether the second terminal device that is mutually redundant with the first terminal device has established the second session, and the DNN, S-NSSAI, and 5QI associated with the second session are the same as those associated with the first session, but the address information of the first terminal device is different from that of the second terminal device. In this case, the session management network element determines that the first session is the redundant session. Otherwise, the session management network element determines that the first session is not the redundant session.

With reference to the first aspect, in some implementations of the first aspect, the method further includes: The session management network element sends a first rule to the second user plane function network element, where the first rule is for duplicating downlink data packets in the first session and the second session or deduplicating uplink data packets in the first session and the second session.

According to the communication method in this embodiment of this application, when the first communication apparatus deployed on the data network does not have the redundancy functionality, a same user plane function network element, that is, the second user plane function network element, is allocated to the redundant session between the first communication apparatus and the second communication apparatus, and the first rule is sent to the second user plane function network element to duplicate and deduplicate data in the first session and the second session, thereby improving communication security and reliability.

With reference to the first aspect, in some implementations of the first aspect, the method further includes: The session management network element sends a second rule to the first port, where the second rule is for duplicating uplink data packets in the first session and the second session or deduplicating downlink data packets in the first session and the second session.

According to the communication method in this embodiment of this application, when the second communication apparatus deployed on the terminal device side does not have the redundancy functionality, a same first port is allocated to the first terminal device and the second terminal device. Both the first terminal device and the second terminal device are connected to the second communication apparatus through the first port, and the second rule is sent to the first port to duplicate and deduplicate data in the first session and the second session, thereby improving communication security and reliability.

With reference to the first aspect, in some implementations of the first aspect, that a session management network element determines whether a first communication apparatus and a second communication apparatus have a redundancy functionality includes: The session management network element obtains, from a policy control function network element, information indicating whether the first communication apparatus has the redundancy functionality, and whether the second communication apparatus has the redundancy functionality.

For example, the session management network element receives one piece of indication information from the policy control function network element, where the indication information indicates whether the first communication apparatus and the second communication apparatus have the redundancy functionality. For another example, the session management network element receives two pieces of indication information from the policy control function network element, where the two pieces of indication information respectively indicate whether the first communication apparatus and the second communication apparatus have the redundancy functionality. The two pieces of indication information may be carried in one message, or may be carried in different messages. This is not limited in this application.

According to the communication method in this embodiment of this application, an execution policy is determined by determining whether the first communication apparatus and the second communication apparatus have the redundancy functionality. For example, when both the first communication apparatus and the second communication apparatus have the redundancy functionality, a network side needs to provide only two independent redundant links. When the first communication apparatus and/or the second communication apparatus do/does not have the redundancy functionality, the network side needs to perform a redundancy proxy. According to the method, data reliability can be ensured without changing an existing communication protocol.

With reference to the first aspect, in some implementations of the first aspect, the session establishment request message includes the first identifier, the first identifier is associated with the second identifier, the first identifier identifies the first terminal device, and the second identifier identifies the second terminal device.

According to a second aspect, a communication method is provided, and includes: A first radio access network device receives a session establishment request message from a first terminal device, where the session establishment request message is for requesting to establish a first session between the first terminal device and a data network. The first radio access network device determines whether a second terminal device establishes a second session with the data network by using the first radio access network device, where the second terminal device and the first terminal device are mutually redundant. When the second terminal device establishes the second session with the data network by using the first radio access network device, the first radio access network device sends the session establishment request message to a second radio access network device; or the first radio access network device sends a response message to the first terminal device, where the response message is for rejecting the session establishment request message.

It should be understood that, that the first terminal device requests the first radio access network device to establish the first session with the data network may be understood as that the first terminal device requests to establish a data transmission channel with the data network. Optionally, the first session and the second session are, for example, protocol data unit (PDU) sessions. A session management network element is, for example, a session management function (SMF). A user plane function network element is, for example, a user plane function (UPF).

Optionally, the session establishment request message includes a first identifier, and the first identifier is associated with a second identifier. The first identifier identifies the first terminal device, the second identifier identifies the second terminal device, and the first terminal device and the second terminal device are mutually redundant.

For example, after receiving the session establishment request message from the first terminal device, the first radio access network device determines whether a redundant terminal device of the first terminal device, that is, the second terminal device, establishes the second session with the data network by using the first radio access network device. When the second terminal device establishes a connection to the data network by using the first radio access network device, the session management network element sends a redundancy identifier to the first radio access network device, where the redundancy identifier identifies the second terminal device. The first radio access network device determines, based on the received redundancy identifier, that the second terminal device establishes the second session with the data network by using the first radio access network device. It may be understood that after the second terminal device establishes the second session with the data network by using the first radio access network device, the session management network element sends the redundancy identifier of the second terminal device to the first radio access network device, to indicate that the second terminal device has established the second session by using the first radio access network device. Correspondingly, the first radio access network device receives the redundancy identifier from the session management network element, and locally stores the redundancy identifier. After receiving the session establishment request message from the first terminal device, the first radio access network device determines, depending on whether the redundancy identifier is locally stored, whether the second terminal device establishes the second session with the data network by using the first radio access network device.

In an implementation, when the first radio access network device receives the session establishment request message from the first terminal device, and determines that the second terminal device has established the second session with the data network by using the first radio access network device, the first radio access network device forwards, through an Xn interface, the session establishment request message sent by the first terminal device to another radio access network device, for example, the second radio access network device.

In another possible implementation, when the second terminal device establishes the second session with the data network by using the first radio access network device, the first radio access network device sends the response message to the first terminal device, where the response message is for rejecting the session establishment request message sent by the first terminal device. After receiving the response message from the first radio access network device, the first terminal device sends a session establishment request message to a radio access network device other than the first radio access network device.

According to the communication method provided in this embodiment of this application, different radio access network devices are allocated to the sessions that are requested to be established by two terminal devices that are mutually redundant, so that two independent redundant links can be established between a first communication apparatus and a second communication apparatus, and data can be backed up through the redundant links, to improve communication reliability. The first communication apparatus and the second communication apparatus communicate with each other by using the first session and the second session.

With reference to the second aspect, in some implementations of the second aspect, the method further includes: The first radio access network device receives the redundancy identifier from the session management network element, where the redundancy identifier identifies the second terminal device, and the redundancy identifier indicates that the second terminal device establishes the second session with the data network by using the first radio access network device.

According to the communication method provided in this embodiment of this application, when the second terminal device establishes the second session with the data network by using the first radio access network device, the first radio access network device can quickly determine a status of the session established by the second terminal device by sending the redundancy identifier to the first radio access network device. This avoids complex signaling interaction and can improve communication efficiency.

With reference to the second aspect, in some implementations of the second aspect, that the first radio access network device determines whether a second terminal device establishes the second session with the data network by using the first radio access network device includes: The radio access network device determines, based on the received redundancy identifier, that the second terminal device establishes the second session with the data network by using the first radio access network device.

With reference to the second aspect, in some implementations of the second aspect, the session establishment request message includes the first identifier, the first identifier is associated with the second identifier, the first identifier identifies the first terminal device, and the second identifier identifies the second terminal device.

According to a third aspect, a communication method is provided, and includes: A session management network element determines whether a first communication apparatus and a second communication apparatus have a redundancy functionality. The session management network element receives a session establishment request message from a first terminal device, where the session establishment request message is for requesting to establish a first session between the first terminal device and a data network, and the first communication apparatus is deployed on the data network. When the first communication apparatus does not have the redundancy functionality, and the first session is a redundant session, the session management network element selects a second user plane function network element to establish the first session.

With reference to the third aspect, in some implementations of the third aspect, the session management network element sends a first mapping relationship between an identifier of the first terminal device and an identifier of a first user plane function network element to a data management network element.

With reference to the third aspect, in some implementations of the third aspect, when a first data network name DNN is the same as a second DNN, first single network slice selection assistance information S-NSSAI is the same as second S-NSSAI, a first 5G quality of service identifier 5QI is the same as a second 5QI, the first terminal device and a second terminal device are mutually redundant, and address information of the first terminal device is different from address information of the second terminal device, the session management network element determines that the first session is the redundant session, where the first DNN, the first S-NSSAI, and the first 5QI are associated with the first session, and the second DNN, the second S-NSSAI, and the second 5QI are associated with a second session.

With reference to the third aspect, in some implementations of the third aspect, the session management network element sends a first rule to the second user plane function network element, where the first rule is for duplicating downlink data packets in the first session and the second session or deduplicating uplink data packets in the first session and the second session.

With reference to the third aspect, in some implementations of the third aspect, that a session management network element determines whether a first communication apparatus and a second communication apparatus have a redundancy functionality includes: The session management network element obtains, from a policy control function network element, information indicating whether the first communication apparatus has the redundancy functionality, and whether the second communication apparatus has the redundancy functionality.

With reference to the third aspect, in some implementations of the third aspect, the session establishment request message includes a first identifier, the first identifier is associated with a second identifier, the first identifier identifies the first terminal device, and the second identifier identifies the second terminal device.

According to a fourth aspect, a communication method is provided, and includes: A session management network element determines whether a first communication apparatus and a second communication apparatus have a redundancy functionality. The session management network element receives a session establishment request message from a first terminal device, where the session establishment request message is for requesting to establish a first session between the first terminal device and a data network. When the second communication apparatus does not have the redundancy functionality, the session management network element allocates a first port to the first terminal device and a second terminal device, where the second communication apparatus is connected to the first terminal device through the first port, and the second communication apparatus is connected to the second terminal device through the first port.

With reference to the fourth aspect, in some implementations of the fourth aspect, the first port includes a DS-TT port.

With reference to the fourth aspect, in some implementations of the fourth aspect, the method further includes: The session management network element sends a first mapping relationship between an identifier of the first terminal device and an identifier of a first user plane function network element to a data management network element.

With reference to the fourth aspect, in some implementations of the fourth aspect, the method further includes: When a first data network name DNN is the same as a second DNN, first single network slice selection assistance information S-NSSAI is the same as second S-NSSAI, a first 5G quality of service identifier 5QI is the same as a second 5QI, the first terminal device and the second terminal device are mutually redundant, and address information of the first terminal device is different from address information of the second terminal device, the session management network element determines that the first session is a redundant session, where the first DNN, the first S-NSSAI, and the first 5QI are associated with the first session, and the second DNN, the second S-NSSAI, and the second 5QI are associated with a second session.

With reference to the fourth aspect, in some implementations of the fourth aspect, the method further includes: The session management network element sends a second rule to the first port, where the second rule is for duplicating uplink data packets in the first session and the second session or deduplicating downlink data packets in the first session and the second session.

With reference to the fourth aspect, in some implementations of the fourth aspect, that a session management network element determines whether a first communication apparatus and a second communication apparatus have a redundancy functionality includes: The session management network element obtains, from a policy control function network element, information indicating whether the first communication apparatus has the redundancy functionality, and whether the second communication apparatus has the redundancy functionality.

With reference to the fourth aspect, in some implementations of the fourth aspect, the session establishment request message includes a first identifier, the first identifier is associated with a second identifier, the first identifier identifies the first terminal device, and the second identifier identifies the second terminal device.

According to a fifth aspect, a communication method is provided, and includes: A session management network element determines whether a first communication apparatus and a second communication apparatus have a redundancy functionality. The session management network element receives a session establishment request message from a first terminal device, where the session establishment request message is for requesting to establish a first session between the first terminal device and a data network, and the first communication apparatus is deployed on the data network. When both the first communication apparatus and the second communication apparatus have the redundancy functionality, and the first session is a redundant session, the session management network element selects a first user plane function network element to establish the first session, where the first user plane function network element is different from a second user plane function network element, the second user plane function network element is configured to establish a second session, the first session is a redundant session of the second session, and the first session and the second session are for communication between the first communication apparatus and the second communication apparatus. When the first communication apparatus does not have the redundancy functionality, and the first session is the redundant session, the session management network element selects the second user plane function network element to establish the first session. When the second communication apparatus does not have the redundancy functionality, the session management network element allocates a first port to the first terminal device and a second terminal device, where the second communication apparatus is connected to the first terminal device through the first port, and the second communication apparatus is connected to the second terminal device through the first port.

According to a sixth aspect, a communication method is provided, and includes: A first terminal device sends a session establishment request message to a first radio access network device, where the session establishment request message is for requesting to establish a first session between the first terminal device and a data network, the session establishment request message includes a first identifier, the first identifier is associated with a second identifier, the first identifier identifies the first terminal device, the second identifier identifies a second terminal device, the first terminal device and the second terminal device are mutually redundant, and the first identifier is for determining whether the second terminal device establishes a second session with the data network by using the first radio access network device, and whether the first session is a redundant session. The first terminal device receives a response message from the first radio access network device, where the response message is for rejecting the session establishment request message. The first terminal device sends the session establishment request message to a second radio access network device, where the second radio access network device is different from the first radio access network device.

According to a seventh aspect, a communication apparatus is provided. The apparatus includes: a processing module, configured to determine whether a first communication apparatus and a second communication apparatus have a redundancy functionality; and a transceiver module, configured to receive a session establishment request message from a first terminal device, where the session establishment request message is for requesting to establish a first session between the first terminal device and a data network. The processing module is further configured to: when both the first communication apparatus and the second communication apparatus have the redundancy functionality, and the first session is a redundant session, select a first user plane function network element to establish the first session, where the first user plane function network element is different from a second user plane function network element, the second user plane function network element is configured to establish a second session, the first session is a redundant session of the second session, and the first session and the second session are for communication between the first communication apparatus and the second communication apparatus.

The transceiver module may perform receiving and sending processing in the first aspect. The processing module may perform processing other than receiving and sending in the first aspect.

According to an eighth aspect, a communication apparatus is provided. The apparatus includes: a transceiver module, configured to receive a session establishment request message from a first terminal device, where the session establishment request message is for requesting to establish a first session between the first terminal device and a data network; and a processing module, configured to determine whether a second terminal device establishes a second session with the data network by using a first radio access network device, where the second terminal device and the first terminal device are mutually redundant. The transceiver module is further configured to: when the second terminal device establishes the second session with the data network by using the first radio access network device, send the session establishment request message to a second radio access network device; or send a response message to the first terminal device, where the response message is for rejecting the session establishment request message.

The transceiver module may perform receiving and sending processing in the second aspect. The processing module may perform processing other than receiving and sending in the second aspect.

According to a ninth aspect, a communication apparatus is provided. The apparatus includes a processor, configured to execute a computer program stored in a memory, so that the communication apparatus performs any possible implementation of the first aspect or the second aspect.

According to a tenth aspect, a computer-readable storage medium is provided. The computer-readable storage medium stores a computer program. When the computer program is run on a computer, the computer is enabled to perform any possible implementation of the first aspect or the second aspect.

According to an eleventh aspect, a computer program product is provided. The computer program product includes computer program instructions. When the computer program instructions are run on a computer, the computer is enabled to perform any possible implementation of the first aspect or the second aspect.

According to a twelfth aspect, a chip system is provided. The chip system includes a processor, configured to invoke and run a computer program from a memory, so that a communication device on which the chip system is installed performs any possible implementation of the first aspect or the second aspect.

BRIEF DESCRIPTION OF THE DRAWINGS

FIG. 10 is a schematic flowchart of a communication method according to still another embodiment of this application;

DETAILED DESCRIPTION OF ILLUSTRATIVE EMBODIMENTS

The following describes technical solutions of this application with reference to accompanying drawings.

The technical solutions provided in this application may be applied to various communication systems such as a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, or a new radio (NR) system.

Naming of a network element may be different in different network systems. The following describes this application by using naming of a network element in a 5G network as an example.

Figure 1:
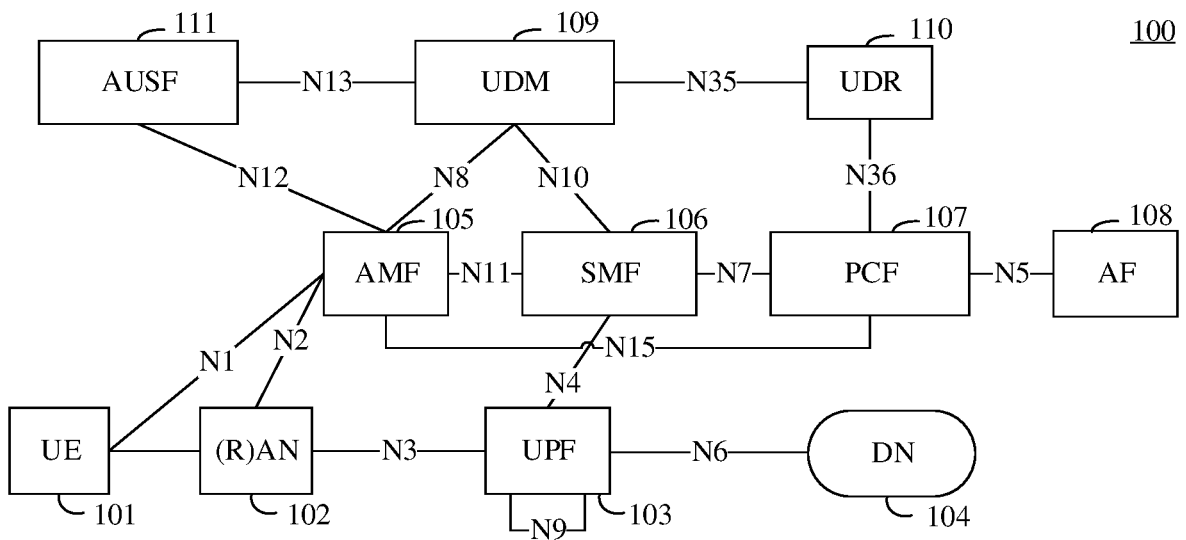
FIG. 1 is a schematic diagram of a network architecture applicable to a method according to an embodiment of this application.

First, with reference to a schematic diagram of a 5G network architecture shown in FIG. 1, main network elements in a 5G network system are briefly described.

1. User equipment (UE) 101 may include various hand-held devices, vehicle-mounted devices, wearable devices, computing devices that have a wireless communication function, or other processing devices connected to a wireless modem, and terminals in various forms, such as a mobile station (MS), a terminal, a software terminal. For example, the UE 101 may be a water meter, an electricity meter, or a sensor.

2. A radio access network (RAN) network element 102 is referred to as a RAN for short below, and corresponds to an access network device.

The radio access network network element 102 is configured to provide a network access function for authorized user equipment in a specific area, and can use transmission tunnels of different quality based on a level of the user equipment, a service requirement, and the like.

The RAN network element can manage a radio resource, and provide an access service for user equipment, to complete forwarding of a control signal and user equipment data between the user equipment and a core network. The RAN network element may also be understood as a base station in a conventional network. For example, the RAN may be an NB, an eNB, a gNB, an ng-eNB, or any other access network device.

3. A user plane function (UPF) 103 is for performing packet routing and forwarding, performing quality of service (QoS) processing on user plane data, and the like.

In the 5G communication system, a user plane network element may be a user plane function (UPF) network element. In a future communication system, the user plane network element may still be a UPF network element, or may have another name. This is not limited in this application.

4. A data network (DN) 104 is a network configured to provide data transmission.

In the 5G communication system, a data network element may be a DN network element. In the future communication system, the data network element may still be a DN network element, or may have another name. This is not limited in this application.

5. An AMF 105 is mainly for performing mobility management, access management, and the like, and may be for implementing a function other than session management in an MME function, for example, functions such as lawful interception and access authorization/authentication.

In the 5G communication system, an access and mobility management network element may be an access and mobility management function (AMF). In the future communication system, an access and mobility management device may still be an AMF, or may have another name. This is not limited in this application.

6. A session management function (SMF) 106 is mainly for session management, internet protocol (IP) address assignment and management of user equipment, selection of an endpoint that can manage a user plane function interface and a policy control and charging function interface, downlink data notification, and the like.

In the 5G communication system, a session management network element may be a session management function network element. In the future communication system, the session management network element may still be an SMF network element, or may have another name. This is not limited in this application.

7. A policy control function (PCF) 107 is a unified policy framework for guiding network behavior, and provides policy rule information or the like for a control plane function network element (for example, an AMF or an SMF).

In a 4G communication system, a policy control network element may be a policy and charging rules function (PCRF) network element. In the 5G communication system, the policy control network element may be a policy control function PCF network element. In the future communication system, the policy control network element may still be a PCF network element, or may have another name. This is not limited in this application.

8. An application function (AF) 108 is for performing data routing affected by an application, accessing a network exposure function network element in a wireless manner, interacting with a policy framework to perform policy control, and the like.

In the 5G communication system, an application network element may be an application function network element. In the future communication system, the application network element may still be an AF network element, or may have another name. This is not limited in this application.

9. Unified data management (UDM) 109 is for UE identifier processing, access authentication, registration, mobility management, and the like.

In the 5G communication system, a data management network element may be a unified data management network element. In the 4G communication system, the data management network element may be a home subscriber server (HSS) network element. In the future communication system, the unified data management may still be a UDM network element, or may have another name. This is not limited in this application.

10. Unified data repository (unified data repository, UDR) 110 mainly includes the following functions: storage and retrieval of subscription data, policy data, application data, and other types of data.

11. An authentication server (e.g. AUSF) 111 is for service authentication, generating a key to implement bidirectional authentication on user equipment, and supporting a unified authentication framework.

In the 5G communication system, the authentication server may be an authentication server function network element. In the future communication system, an authentication server function network element may still be an AUSF network element, or may have another name. This is not limited in this application.

It may be understood that the foregoing network elements or functions may be network elements in a hardware device, may be software functions running on dedicated hardware, or may be virtualized functions instantiated on a platform (for example, a cloud platform). For ease of description, in this application, an example in which a network device is an access and mobility management network element AMF and a base station is a radio access network RAN is used for subsequent description.

In the network architecture shown in FIG. 1, the user equipment is connected to the AMF through an N1 interface, the RAN is connected to the AMF through an N2 interface, and the RAN is connected to the UPF through an N3 interface. The UPFs are connected to each other through an N9 interface, and the UPF is connected to the DN through an N6 interface. The SMF controls the UPF through an N4 interface. The AMF interworks with the SMF through an N11 interface. The AMF obtains user equipment subscription data from a UDM unit through an N8 interface, and the SMF obtains the user equipment subscription data from the UDM unit through an N10 interface.

It should be understood that the foregoing network architecture used in embodiments of this application is merely an example for description, and a network architecture applicable to embodiments of this application is not limited thereto. Any network architecture that can implement functions of the foregoing network elements is applicable to embodiments of this application.

For example, in some network architectures, network function network element entities such as an AMF, an SMF network element, a PCF network element, a BSF network element, and a UDM network element are all referred to as network function (network function, NF) network elements. Alternatively, in some other network architectures, a set of network elements such as an AMF, an SMF network element, a PCF network element, a BSF network element, and a UDM network element may be referred to as a control plane function network element.

For ease of understanding of embodiments of this application, some concepts or terms used in this application are first briefly described.

1. Industrial Ethernet

The industrial Ethernet is application of Ethernet-related components and technologies in automatic control and process control of industrial environment. The industrial Ethernet uses a transmission control protocol/internet protocol (TCP/IP), which is compatible with an IEEE 802.3 standard. However, the industrial Ethernet adds its own protocol to an application layer. The application of Ethernet in an industrial program requires a real-time feature, and many Ethernet-related technologies can make the Ethernet applicable to the industrial application. Use of standard Ethernet improves interconnection of devices from different vendors in a factory. An Ethernet market is large, and a related component has a low cost and is easy to obtain. Therefore, cost of the industrial Ethernet can be reduced, and performance can be improved with development of the Ethernet technology.

2. Industrial Redundancy Protocol

In the industrial Ethernet, to ensure service reliability and continuity, different industrial redundancy protocols are designed for common network topologies in an industrial automation network. Among these protocols, mainstream industrial redundancy protocols include a media redundancy protocol (MRP), a parallel redundancy protocol (PRP), and a high-availability seamless redundancy (HSR) protocol. The MRP and the HSR are mainly for a ring network, and the PRP may be applicable to any network topology.

3. MRP Protocol

An MRP network includes a media redundancy manager (MRM) and a media redundancy client (MRC). The MRM sends probe packets to two ports connected to the ring network. In a normal case, the probe packet is received on the other port through the ring network. In this case, the MRM considers that the network is normal and marks one of the ports as blocked. The MRM does not send or receive service data normally but sends only the probe packet for link detection. In this case, the network becomes a chain network. When a segment of the network is abnormal, the probe packet cannot be received normally. In this case, the MRM is triggered to activate the blocked port. The MRM duplicates a data packet to be transmitted and sends the data packets to the network through two ports to ensure that each MRC can successfully receive a corresponding data packet. When the MRC receives duplicate data packets from the two ports, the data packets need to be deduplicated.

4. HSR Protocol

The HSR protocol is a redundancy protocol with zero switching delay. The HSR protocol is also for the ring network. Data packets are sent simultaneously on two ports in which a device is connected to the ring network. Compared with a standard Ethernet data packet, the HSR protocol adds a redundant header for duplication and deduplication. When receiving duplicate data packets from the two ports, the device discards a subsequent same data packet based on the redundant header. Therefore, when a point on a loop is abnormal, the HSR protocol can ensure that all devices can receive correct data packets without switching.

5. PRP Protocol

The PRP protocol is also a redundancy protocol with a zero switching delay. The PRP protocol requires that two devices that are in communication may be connected by using two completely irrelevant networks, such as, two irrelevant local area networks (LANs). A communication data packet is duplicated on two links for simultaneous transmission. Unlike the HSR, the PRP protocol adds a redundancy domain at the end of a standard Ethernet packet, and a device supporting the PRP protocol can perform deduplication based on the redundancy domain. The device supporting the protocol can also tolerate an error on a single network and does not require link switching.

6. Protocol Data Unit (PDU) Session (PDU Session)

A 5G corenet (5GC) supports a PDU connection service. The PDU connection service may be a service of exchanging a PDU data packet between a terminal device and a DN. The PDU connection service is implemented by initiating establishment of a PDU session by the terminal device. After one PDU session is established, a data transmission channel between the terminal device and the DN is established. In other words, the PDU session is at a UE level. Each terminal device may establish one or more PDU sessions. The terminal device may access the DN by using the PDU session established between the terminal device and the DN.

As described above, the SMF is mainly responsible for session management in a mobile network. The PDU session may be established, modified, or released between the terminal device and the SMF by using NAS session management (session management, SM) signaling.

In embodiments of this application, the terminal device may establish a plurality of PDU sessions or a plurality of PDU connection services. For example, the terminal device may establish two or more PDU sessions. The plurality of PDU sessions are not limited. For example, DN identifiers (e.g. data network names, DNNs) of these PDU sessions may be different or the same. For another example, different PDU sessions may be served by a same SMF, or may be served by different SMFs. For another example, establishment of these PDU sessions may be initiated simultaneously or successively.

Figure 2:
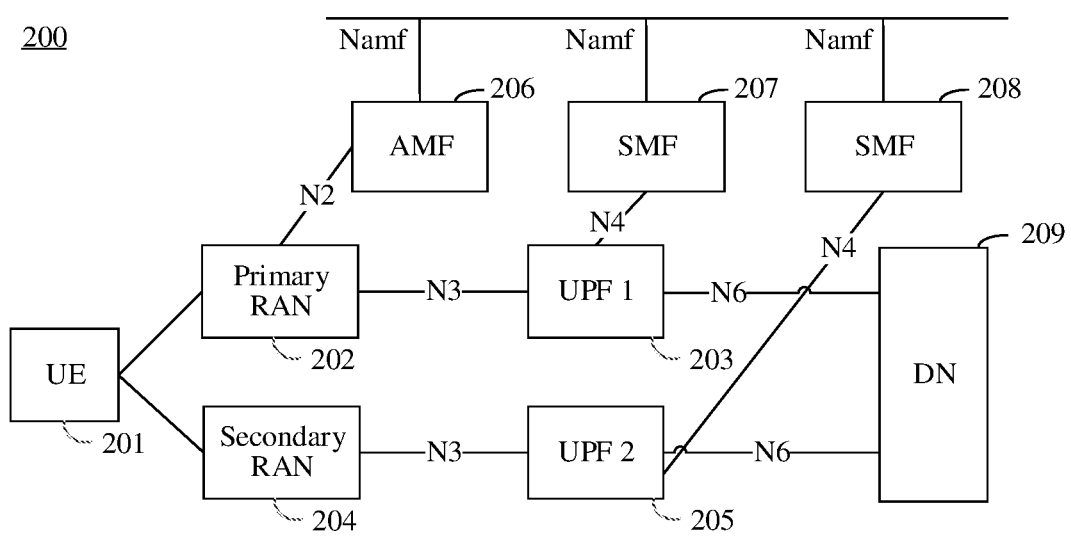
FIG. 2 is a schematic diagram of a network architecture for ensuring communication reliability.
Figures 3, 4:
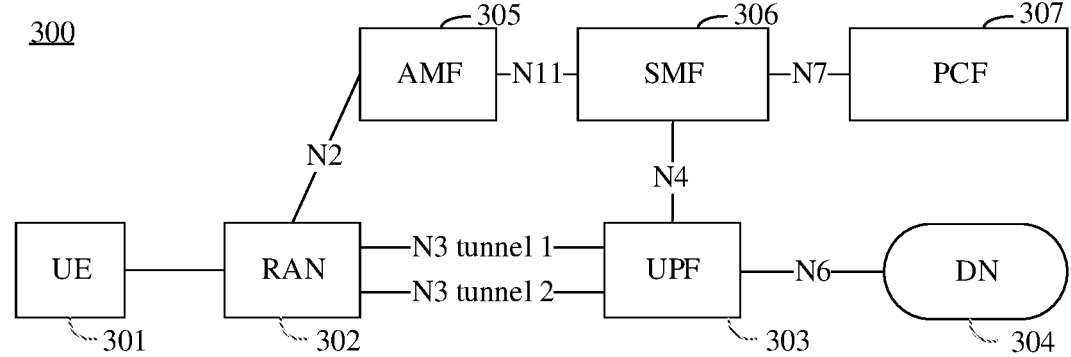
FIG. 3 is a schematic diagram of another network architecture for ensuring communication reliability.
FIG. 4 is a schematic diagram of still another network architecture for ensuring communication reliability.

For ease of understanding of a wireless communication method provided in embodiments of this application, the following briefly describes several methods for ensuring communication reliability between a data network and user equipment in a 5G network with reference to FIG. 2 to FIG. 4.

FIG. 2 is a schematic diagram of a network architecture 200 in which communication reliability is ensured by using a redundant PDU session. It can be learned from FIG. 2 that two PDU sessions are established between a DN and UE, and the two PDU sessions use mutually independent links, that is, access the DN by using different RANs and UPFs.

FIG. 3 is a schematic diagram of a network architecture 300 in which communication reliability is ensured by a redundant N3 tunnel. It can be learned from FIG. 3 that one PDU session is established between a DN and UE, but two tunnels are established on an N3 interface by using a core network for redundant data transmission, and duplication and deduplication are performed on a RAN and a UPF.

FIG. 4 is a schematic diagram of a network architecture 400 in which communication reliability is ensured by a redundant N3 tunnel and N9 tunnel. It can be learned from FIG. 4 that one PDU session is established between a DN and UE, and redundancy is performed on an N3 interface and an N9 interface. An anchor UPF is connected to different intermediate-user plane functions (intermediate-user plane functions, I-UPFs) through a redundant N9 interface, and then is connected to a RAN through a redundant N3 interface. Data duplication and deduplication are performed on the anchor UPF and the RAN.

Figure 5:
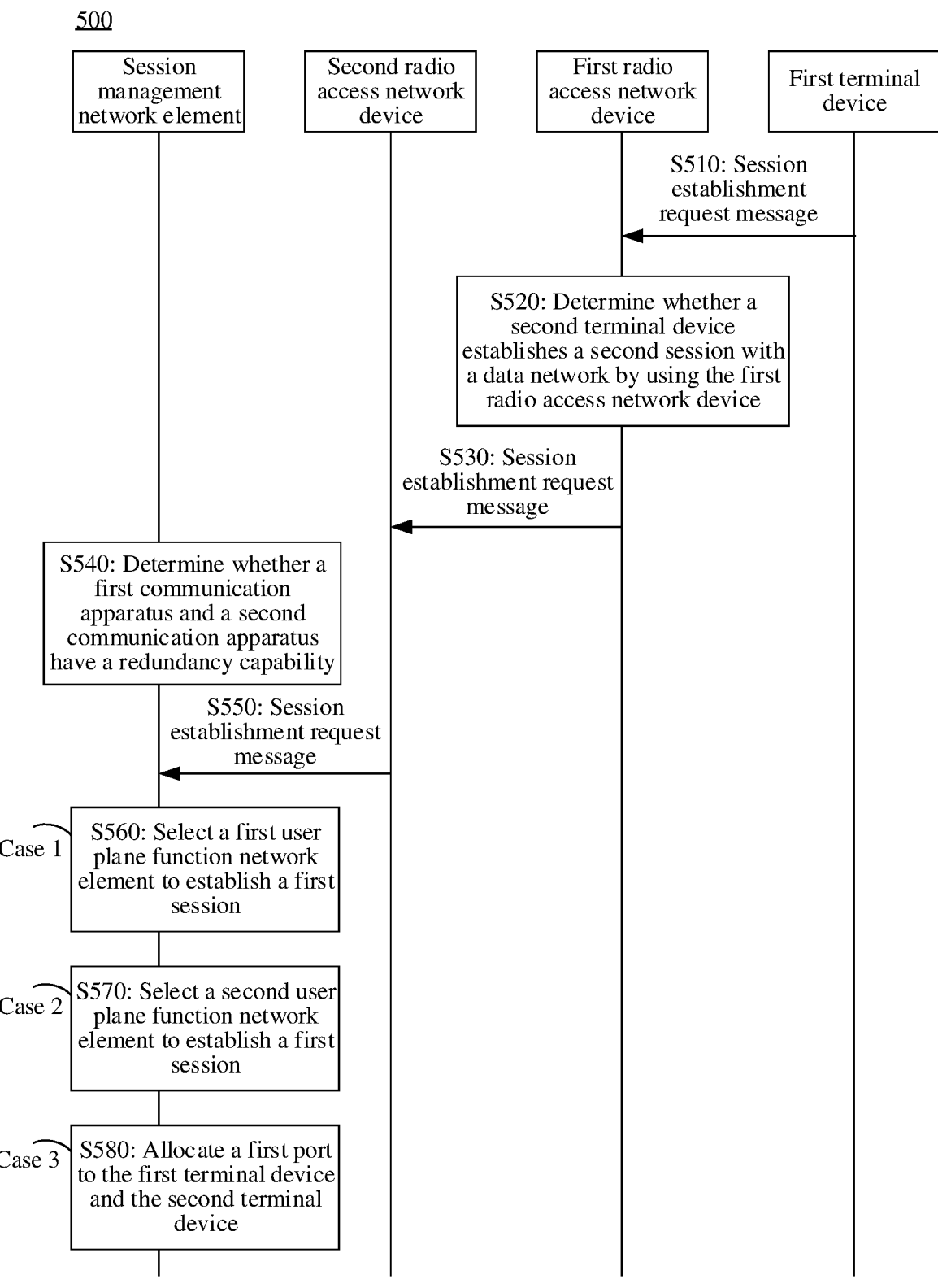
FIG. 5 is a schematic flowchart of a communication method according to an embodiment of this application.

It can be learned from the foregoing descriptions that, in the network architectures shown in FIG. 2 to FIG. 4, communication reliability between the data network DN and the single UE is ensured in a dual-connectivity manner. However, only redundant data transmission on a core network side is considered in the foregoing solutions. In a scenario in which the 5G network is converged with another network, for example, in a scenario in which the 5G network is converged with an industrial network, an industrial device accesses the 5G network by using a plurality of UEs to communicate with a DN. The foregoing dual-connectivity solution can ensure reliability of only a single link from the DN to the UE. Communication reliability cannot be improved in the scenario in which the 5G network is converged with the industrial network. FIG. 5 is a schematic flowchart of a method 500 according to an embodiment of this application. It can be learned from FIG. 5 that the method 500 includes the following steps.

S510. A first terminal device sends a session establishment request message to a first radio access network device, where the session establishment request message is for requesting to establish a first session between the first terminal device and a data network.

That the first terminal device requests the first radio access network device to establish the first session with the data network may be understood as that the first terminal device requests to establish a data transmission channel with the data network. Optionally, the first session is, for example, a PDU session.

Optionally, the session establishment request message includes a first identifier, and the first identifier is associated with a second identifier. The first identifier identifies the first terminal device, the second identifier identifies a second terminal device, and the first terminal device and the second terminal device are mutually redundant.

That the first terminal device and the second terminal device are mutually redundant may be understood as that the first terminal device and the second terminal device are two terminal devices that are connected to a same communication apparatus or a same group of communication apparatuses and transmit same data through different links. To be specific, a communication apparatus or a group of communication apparatuses establish two different links by using the first terminal device and the second terminal device, and transmit same data through the two links.

That the first identifier is associated with the second identifier may indicate that there is an association relationship between the first terminal device and the second terminal device that are mutually redundant. For example, before S510, the first terminal device and the second terminal device complete a network registration procedure, and the first terminal device and the second terminal device are bound to each other during network registration. For example, the first terminal device carries an identifier of the second terminal device when requesting to perform network registration, and the second terminal device carries an identifier of the first terminal device when requesting to perform network registration. After the first terminal device and the second terminal device complete network registration, a network device stores a redundancy relationship between the first identifier and the second identifier. For example, the network device stores a first mapping relationship between the first terminal device and the second terminal device. When the first terminal device carries the first identifier in the session establishment request message, the network device may determine the second terminal device based on the first identifier and the first mapping relationship.

S520. The first radio access network device determines whether the second terminal device establishes a second session with the data network by using the first radio access network device.

After receiving the session establishment request message from the first terminal device, the first radio access network device determines whether a redundant terminal device of the first terminal device, that is, the second terminal device, establishes the second session with the data network by using the first radio access network device. In an example, when the second terminal device establishes a connection to the data network by using the first radio access network device, a session management network element sends a redundancy identifier to the first radio access network device, where the redundancy identifier identifies the second terminal device. The first radio access network device determines, based on the received redundancy identifier, that the second terminal device establishes the second session with the data network by using the first radio access network device. It may be understood that after the second terminal device establishes the second session with the data network by using the first radio access network device, the session management network element sends the redundancy identifier of the second terminal to the first radio access network device, to indicate that the second terminal device has established the second session by using the first radio access network device. Correspondingly, the first radio access network device receives the redundancy identifier from the session management network element, and locally stores the redundancy identifier. After receiving the session establishment request message from the first terminal device, the first radio access network device determines, depending on whether the redundancy identifier is locally stored, whether the second terminal device establishes the second session with the data network by using the first radio access network device.

S530. When the second terminal device establishes the second session with the data network by using the first radio access network device, the first radio access network device sends the session establishment request message to a second radio access network device.

For example, when the first radio access network device receives the session establishment request message from the first terminal device, and determines that the second terminal device has established the second session with the data network by using the first radio access network device, the first radio access network device forwards, through an Xn interface, the session establishment request message sent by the first terminal device to another radio access network device, for example, the second radio access network device.

Alternatively, in another possible implementation, when the second terminal device establishes the second session with the data network by using the first radio access network device, the first radio access network device sends a response message to the first terminal device, where the response message is for rejecting the session establishment request message sent by the first terminal device. After receiving the response message from the first radio access network device, the first terminal device sends a session establishment request message to a radio access network device other than the first radio access network device.

S540. The session management network element determines whether a first communication apparatus and a second communication apparatus have a redundancy functionality.

It should be understood that, that one communication apparatus has a redundancy functionality indicates that the communication apparatus has a capability of performing redundancy backup on data, to be specific, can duplicate or deduplicate a data packet. For example, in an industrial network scenario, that an industrial device supports an industrial redundancy protocol, for example, an MRP, may indicate that the industrial device has a redundancy functionality.

It should be understood that the session management network element may determine, in a process in which the first terminal device registers with and accesses a network, or after the first terminal device registers with and accesses the network, whether the first communication apparatus and the second communication apparatus have the redundancy functionality. The session management network element may determine, by using an application function network element, whether the first communication apparatus and the second communication apparatus have the redundancy functionality. The application function network element may be, for example, an application function AF.

It should be further understood that S540 may be performed before S510, or may be performed after S510. This is not limited in this application.

It should be noted that both the first communication apparatus and the second communication apparatus may be deployed on a terminal device side, or one may be deployed on the terminal device side, and the other may be deployed on the data network. A communication apparatus deployed on the terminal device side accesses the network by using at least two terminal devices that are mutually redundant, to implement a connection to another communication apparatus. For example, in this embodiment, the second communication apparatus is deployed on the terminal device side, and the second communication apparatus accesses the network by using the first terminal device and the second terminal device, to implement a connection to the first communication apparatus. The first session established by the first terminal device and the second session established by the second terminal device are for communication between the first communication apparatus and the second communication apparatus.

Optionally, the session management network element obtains, from a policy control function network element, information indicating whether the first communication apparatus has the redundancy functionality, and whether the second communication apparatus has the redundancy functionality. For example, the session management network element receives one piece of indication information from the policy control function network element, where the indication information indicates whether the first communication apparatus and the second communication apparatus have the redundancy functionality. For another example, the session management network element receives two pieces of indication information from the policy control function network element, where the two pieces of indication information respectively indicate whether the first communication apparatus and the second communication apparatus have the redundancy functionality. The two pieces of indication information may be carried in one message, or may be carried in different messages. This is not limited in this application.

S550. The second radio access network device sends the session establishment request message from the first terminal device to the session management network element.

For example, the session management network element receives the session establishment request message, where the session establishment request message is for requesting to establish the first session between the first terminal device and the data network. Further, the session management network element determines whether the first session is a redundant session. It should be understood that the session management network element may first determine whether the first communication apparatus and the second communication apparatus have the redundancy functionality, and then determine whether the first session is the redundant session, or may first determine whether the first session is the redundant session, and then determine whether the first communication apparatus and the second communication apparatus have the redundancy functionality. An execution sequence of actions is not limited in this application.

When a first data network name DNN is the same as a second DNN, first single network slice selection assistance information S-NSSAI is the same as second S-NSSAI, a first 5G quality of service identifier 5QI is the same as a second 5QI, the first terminal device and the second terminal device are mutually redundant, and address information of the first terminal device is different from address information of the second terminal device, the session management network element determines that the first session is the redundant session, where the first DNN, the first S-NSSAI, and the first 5QI are associated with the first session, and the second DNN, the second S-NSSAI, and the second 5QI are associated with the second session. To be specific, when the first terminal device requests the session management network element to establish the first session, the session management network element queries whether the second terminal device that is mutually redundant with the first terminal device has established the second session, and the DNN, S-NSSAI, and 5QI associated with the second session are the same as those associated with the first session, but the address information of the first terminal device is different from that of the second terminal device. In this case, the session management network element determines that the first session is the redundant session. Otherwise, the session management network element determines that the first session is not the redundant session.

Case 1: When both the first communication apparatus and the second communication apparatus have the redundancy functionality, and the first session is the redundant session, in S560, the session management network element selects a first user plane function network element to establish the first session, where the first user plane function network element is different from a second user plane function network element, and the second user plane function network element is configured to establish the second session. To be specific, when both the first communication apparatus and the second communication apparatus have the redundancy functionality, and the second session is a redundant session of the first session, the session management network element selects different user plane function network elements for the first session and the second session.

Case 2: When the first communication apparatus does not have the redundancy functionality, the first session is the redundant session, and the first communication apparatus is deployed on the data network, in S570, the session management network element selects the second user plane function network element to establish the first session. To be specific, the session management network element selects a same user plane function network element for the first session and the second session.

Further, the session management network element sends a first rule to the second user plane function network element, where the first rule is for duplicating downlink data packets in the first session and the second session or deduplicating uplink data packets in the first session and the second session.

Case 3: When the second communication apparatus does not have the redundancy functionality and the second communication apparatus is deployed on the terminal device side, in S580, the session management network element allocates a first port to the first terminal device and the second terminal device, where the second communication apparatus is connected to the first terminal device through the first port, and the second communication apparatus is connected to the second terminal device through the first port. The first port is, for example, a DS-TI port.

It should be understood that the case 2 and the case 3 may occur at the same time. To be specific, in a specific case, neither the first communication apparatus nor the second communication apparatus has the redundancy functionality. In this case, solutions of S570 and S580 may be combined for implementation.

Further, the session management network element sends a second rule to the first port, where the second rule is for duplicating uplink data packets in the first session and the second session or deduplicating downlink data packets in the first session and the second session.

Therefore, according to the communication method provided in this embodiment of this application, the network device provides at least two independent redundant links between two communication apparatuses, to improve communication security and reliability. When both the two communication apparatuses have a redundancy functionality, the network device allocates different radio access network devices and user plane function network elements to sessions established by two terminal devices. When a communication apparatus deployed on the data network does not have a redundancy functionality, the network device allocates a same user plane function network element to the sessions established by the two terminal devices. When a communication apparatus deployed on the terminal device side does not have a redundancy functionality, the network device allocates a same port to the two communication apparatuses.

For convenience, in the following embodiments, an example in which an industrial device communicates by using a 5G network is used for description. Specifically, an example in which a primary device and a secondary device in the industrial device communicate by using the 5G network is used for description. The primary device is, for example, a primary controller, and the secondary device is, for example, an industrial input/output (input/output, I/O) device.

A method 600, a method 700, a method 1000, and a method 1100 are described by using an example in which the primary device is deployed on a DN, and the secondary device is deployed on a UE side.

Figure 6:
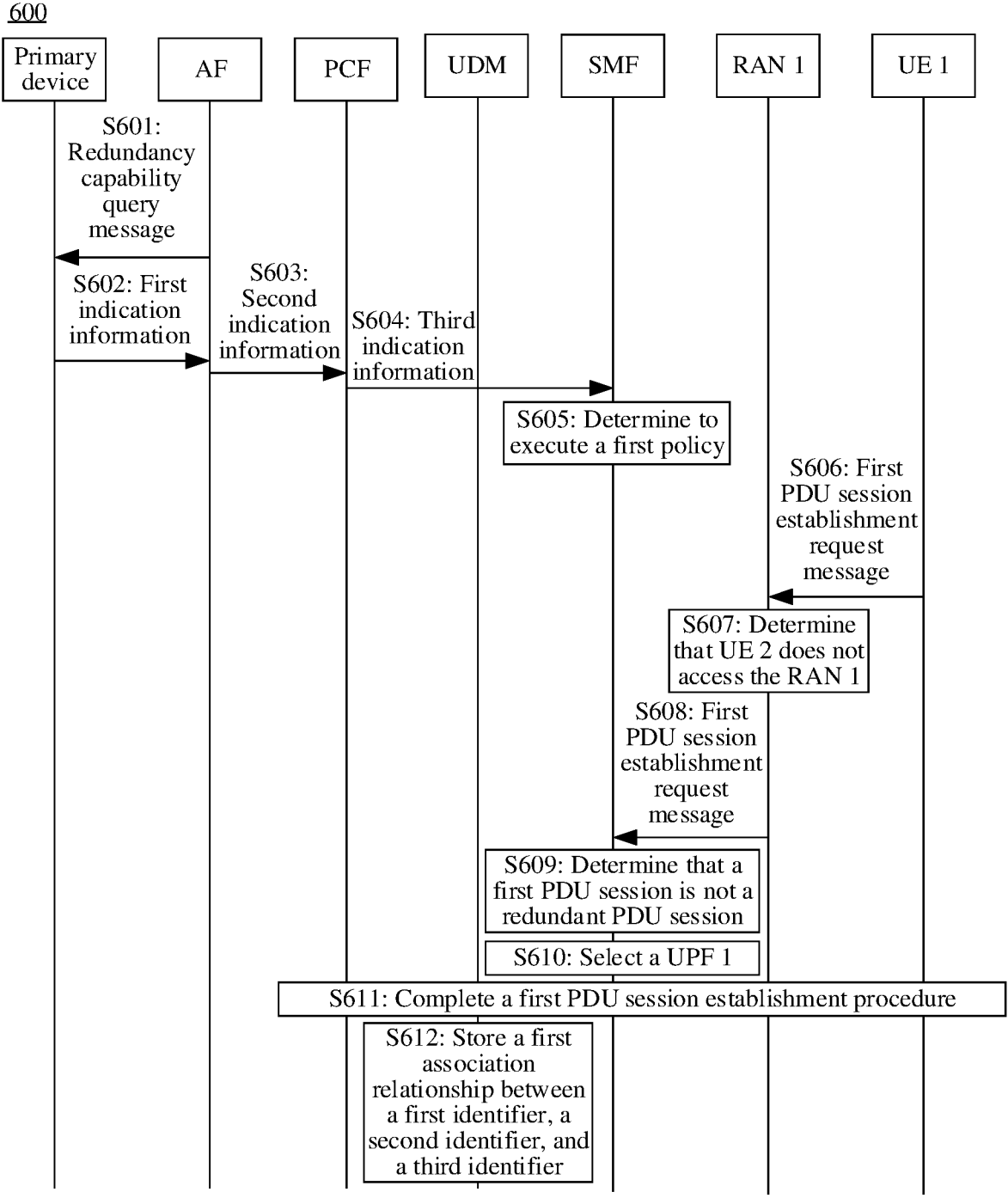
FIG. 6 is a schematic flowchart of a communication method according to another embodiment of this application.

FIG. 6 is a schematic flowchart of the method 600 according to an embodiment of this application. It can be learned from FIG. 6 that the method 600 includes the following steps.

S605. An SMF determines a first policy.

For example, the SMF determines the first policy, where the first policy includes allocating different UPFs to UE 1 and UE 2. The UE 1 and the UE 2 are two UEs that are mutually redundant.

It should be noted that the UE 1 and the UE 2 are two UEs that are mutually redundant. It may be understood as that the UE 1 and the UE 2 are two UEs that are connected to a same secondary device or a same group of Secondaries and transmit same data.

It should be further noted that, before S605, the UE 1 and the UE 2 have completed a network registration procedure. In a possible implementation, the UE 1 and the UE 2 are bound to each other during network registration. For example, the UE 1 carries an identifier of the UE 2 during registration. In a network registration process of the UE 1 and the UE 2, or after the network registration is completed, a network device stores a redundancy relationship between the UE 1 and the UE 2. For example, the network device locally stores a first mapping relationship between an identity document (identity document, ID) of the UE 1 and an ID of the UE 2, where the first mapping relationship may indicate that the UE 1 and the UE 2 are mutually redundant. In another possible implementation, the network device may actively obtain and store the redundancy relationship between the UE 1 and the UE 2. For example, in the network registration process of the UE 1 and the UE 2, or after the network registration is completed, the network device obtains the redundancy relationship between the UE 1 and the UE 2 from an application function AF by using a network exposure function NEF, and locally stores the redundancy relationship between the UE 1 and the UE 2.

In an example, the SMF determines whether a primary device and a secondary device have a redundancy functionality. When both the primary device and the secondary device have the redundancy functionality, the SMF determines the first policy. It should be understood that, in this embodiment, the primary device is deployed on a DN, the secondary device is deployed on a UE side, and the secondary device accesses a network by using the UE 1 and the UE 2 to communicate with the primary device.

It should be understood that, that the primary device and the secondary device have the redundancy functionality may be understood as that the primary device and the secondary device have a capability of performing redundancy backup, duplication, and deduplication on a data packet. For example, both the primary device and the secondary device support an MRP industrial redundancy protocol, a PRP industrial redundancy protocol, an HSR industrial redundancy protocol, and the like. In this embodiment, the primary device is deployed on the DN, and the secondary device is deployed on the UE side. The secondary device establishes connections to the UE 1 and the UE 2, and expects to access the DN by using the UE 1 and the UE 2.

Specifically, the AF determines, by using the primary device, whether the primary device and the secondary device have the redundancy functionality. For example, in S601, the AF sends a redundancy functionality query message to the primary device, and in S602, the primary device sends first indication information to the AF based on the redundancy functionality query message, where the first indication information indicates whether the primary device and the secondary device have the redundancy functionality. It should be noted that the primary device herein is a primary controller. Therefore, the AF may determine, by using only the primary device, whether the primary device and the secondary device have the redundancy functionality. If the primary device herein is a communication device that cannot determine the redundancy functionality of the secondary device, the AF queries the primary device and the secondary device for their redundancy capabilities. When both the primary device and the secondary device have the redundancy functionality, in S603, the AF sends, to a PCF, second indication information indicating that both the primary device and the secondary device have the redundancy functionality. Further, in S604, the PCF sends third indication information to the SMF to indicate that both the primary device and the secondary device have the redundancy functionality. The SMF determines, based on the third indication information sent by the PCF, that both the primary device and the secondary device have the redundancy functionality. Therefore, the SMF determines the first policy.

In another example, the SMF determines the first policy based on an indication of the PCF.

Specifically, the AF determines, by using the primary device, whether the primary device and the secondary device have the redundancy functionality. For example, in S601, the AF sends a redundancy functionality query message to the primary device. When both the primary device and the secondary device have the redundancy functionality, in S602, the primary device sends first indication information to the AF to indicate that both the primary device and the secondary device have the redundancy functionality. Then, in S603, the AF sends, to the PCF, second indication information indicating that both the primary device and the secondary device have the redundancy functionality. After determining that both the primary device and the secondary device have the redundancy functionality, the PCF determines the first policy. Further, in S604, the PCF sends third indication information to the SMF to indicate the SMF to determine the first policy.

It should be noted that, both the primary device and the secondary device have the redundancy functionality, which indicates that the primary device and the secondary device themselves can perform redundancy backup on data. Therefore, a redundancy backup operation may be performed inside the primary device and the secondary device to ensure reliability of data transmission. When the primary device and the secondary device communicate with each other by using a 5G network, the 5G network needs to provide only two redundant links for transmission between the primary device and the secondary device. Therefore, when both the primary device and the secondary device have the redundancy functionality, the PCF or the SMF determines the first policy.

S606. The UE 1 sends a first PDU session establishment request message to a RAN 1.

For example, the UE 1 sends the first PDU session establishment request message to the RAN 1, where the first PDU session establishment request message is for requesting to establish a PDU session between the UE 1 and the data network DN.

It should be understood that the UE 1 may independently perform a PDU session establishment procedure after completing the network registration, or may perform a PDU session establishment procedure based on an indication of the secondary device. This is not limited in this application.

S607. The RAN 1 determines that the UE 2 does not access the RAN 1.

For example, after receiving the first PDU session establishment request message from the UE 1, the RAN 1 determines, based on the ID of the UE 1 and the first mapping relationship, that redundant UE of the UE 1 is the UE 2. Further, the RAN 1 determines whether the UE 2 has accessed the RAN 1.

It should be noted that, that the UE 2 has accessed the RAN 1 may be understood as that the UE 2 has established a session with the data network by using the RAN 1.

In a possible implementation, when the UE 2 has accessed the RAN 1, that is, the UE 2 has established a PDU session with the data network by using the RAN 1, the network device sends an identifier of the UE 2 to the RAN 1 after establishment of the PDU session is completed. For example, the SMF sends the identifier of the UE 2 to the RAN 1 by using an AMF. The identifier of the UE 2 indicates that the UE 2 has established the PDU session with the data network by using the RAN 1. After the RAN 1 receives the first PDU session establishment request message from the UE 1, the RAN 1 determines, based on the ID of the UE 1 and the first mapping relationship, that the redundant UE of the UE 1 is the UE 2, and then the RAN 1 queries whether the identifier of the UE 2 is locally stored. If the RAN 1 locally stores the identifier of the UE 2, the RAN 1 determines that the UE 2 has accessed the RAN 1. If the RAN 1 does not locally store the identifier of the UE 2, the RAN 1 determines that the UE 2 does not access the RAN 1.

In this possible implementation, if the UE 2 has accessed the RAN 1, the RAN 1 stores the identifier of the UE 2 in advance. In this way, when the UE 1 requests to access the RAN 1, the RAN 1 may directly determine whether the redundant UE of the UE 1 has accessed the RAN 1, so that a signaling procedure of requesting a query from a core network is avoided, and signaling overheads are reduced.

When the RAN 1 determines that the UE 2 does not access the RAN 1, for example, when the UE 2 has not established the PDU session, or the UE 2 establishes the PDU session, but a RAN accessed by the UE 2 is different from the RAN 1, in S608, the RAN 1 sends the first PDU session establishment request message to the SMF, where the first PDU session establishment request message is for requesting to establish the PDU session between the UE 1 and the data network DN.

For example, the RAN 1 sends the first PDU session establishment request message to the AMF (not shown in the figure). After receiving the first PDU session establishment request message, the AMF selects an SMF, and then the AMF sends the first PDU session establishment request message to the selected SMF.

It should be noted that in this embodiment, only an example in which messages in S606 and S608 are the same is used for description. However, messages in S606 and S608 may alternatively be different, but both are for requesting to establish the PDU session between the UE 1 and the data network DN. This is not limited in this application.

It should be further noted that the RAN 1 may perform the foregoing determining process based on preconfigured policy information. For example, when the RAN 1 receives a PDU session establishment request message sent by a UE, the RAN 1 determines whether there is a redundant UE for the UE. If there is no redundant UE for the UE, the RAN 1 continues to perform a subsequent procedure. If there is a redundant UE for the UE, the RAN 1 determines whether the redundant UE has accessed the RAN 1. If the redundant UE does not access the RAN 1, the RAN 1 continues to perform a subsequent procedure. If the redundant UE has accessed the RAN 1, the RAN 1 rejects the PDU session establishment request message, or forwards the PDU session establishment request message to another RAN. Alternatively, the RAN 1 may perform the foregoing determining process based on an indication of the PCF or the SMF. For example, before S605, if the PCF or the SMF determines that both the primary device and the secondary device have the redundancy functionality, the PCF or the SMF sends indication information to the RAN 1, where the indication information indicates that the RAN 1 can access only at most one of the UE 1 and the UE 2. The RAN 1 performs the foregoing determining process based on the indication information.

S609. The SMF determines that a first PDU session is not a redundant PDU session.

It should be noted that, that the first PDU session is the redundant PDU session indicates that there is another PDU session whose connected data network, requested slice type, and associated quality of service (QoS) feature are the same as those of the first PDU session, but UE is different.

For example, the SMF receives the first PDU session establishment request message from the RAN 1 in S608. Optionally, the first PDU session establishment request message includes a first data network name (DNN), first single network slice selection assistance information (S-NS-SAI), a first 5G quality of service identifier (5QI), and address information of the UE 1, where the first DNN identifies a data network that the UE 1 requests to access, the first S-NSSAI identifies a network slice that the UE 1 requests to access, and the first 5QI identifies a quality of service (QoS) feature of the first PDU session. The SMF determines, based on the ID of the UE 1 and the first mapping relationship, that the redundant UE of the UE 1 is the UE 2, and then the SMF requests UDM, based on the ID of the UE 2, to query information about a PDU session of the UE 2, to determine whether a DNN, S-NSSAI, and a 5QI associated with the PDU session are the same as the first DNN, the first S-NSSAI, and the first 5QI, where UE associated with the PDU session is redundant UE of the UE 1, but address information of the UE associated with the PDU session, that is, the address information of the UE 2, is different from the address information of the UE 1. If the foregoing case exists, the SMF determines that the first PDU session is the redundant PDU session.

S610. The SMF selects a UPF 1.

For example, when the SMF determines that the first PDU session is not the redundant PDU session, for example, when the UE 1 requests to establish the first PDU session, the UE 2 has not established the PDU session, and in this case, the SMF continues to perform the PDU session establishment procedure. For example, the SMF selects the UPF 1, and sends an N4 session establishment request message to the UPF 1

S611. A network side completes a first PDU session establishment procedure.

It should be understood that a subsequent specific procedure for establishing the first PDU session is not limited in this application.

S612. The UDM stores a first association relationship between a first identifier, a second identifier, and a third identifier.

For example, the UDM stores the first association relationship between the first identifier, the second identifier, and the third identifier in a process of establishing the first PDU session or after the establishment of the first PDU session is completed. The first identifier, the second identifier, and the third identifier are respectively identifiers of the UE 1, the RAN 1, and the UPF 1.

Optionally, in another implementation, the PCF or the SMF may separately allocate two reliability group identifiers, such as a first reliability group identifier and a second reliability group identifier, to the UE 1 or the UE 2 after the UE 1 and the UE 2 complete the network registration. The first reliability group identifier is associated with the UE 1, the second reliability group identifier is associated with the UE 2, and both the first reliability group identifier and the second reliability group identifier are unique. After the establishment of the first PDU session is completed, the first association relationship may be identified by the first reliability group identifier. For example, association relationships between the first reliability group identifier and the first identifier, the second identifier, and the third identifier are respectively stored in the UDM.

Figure 7:
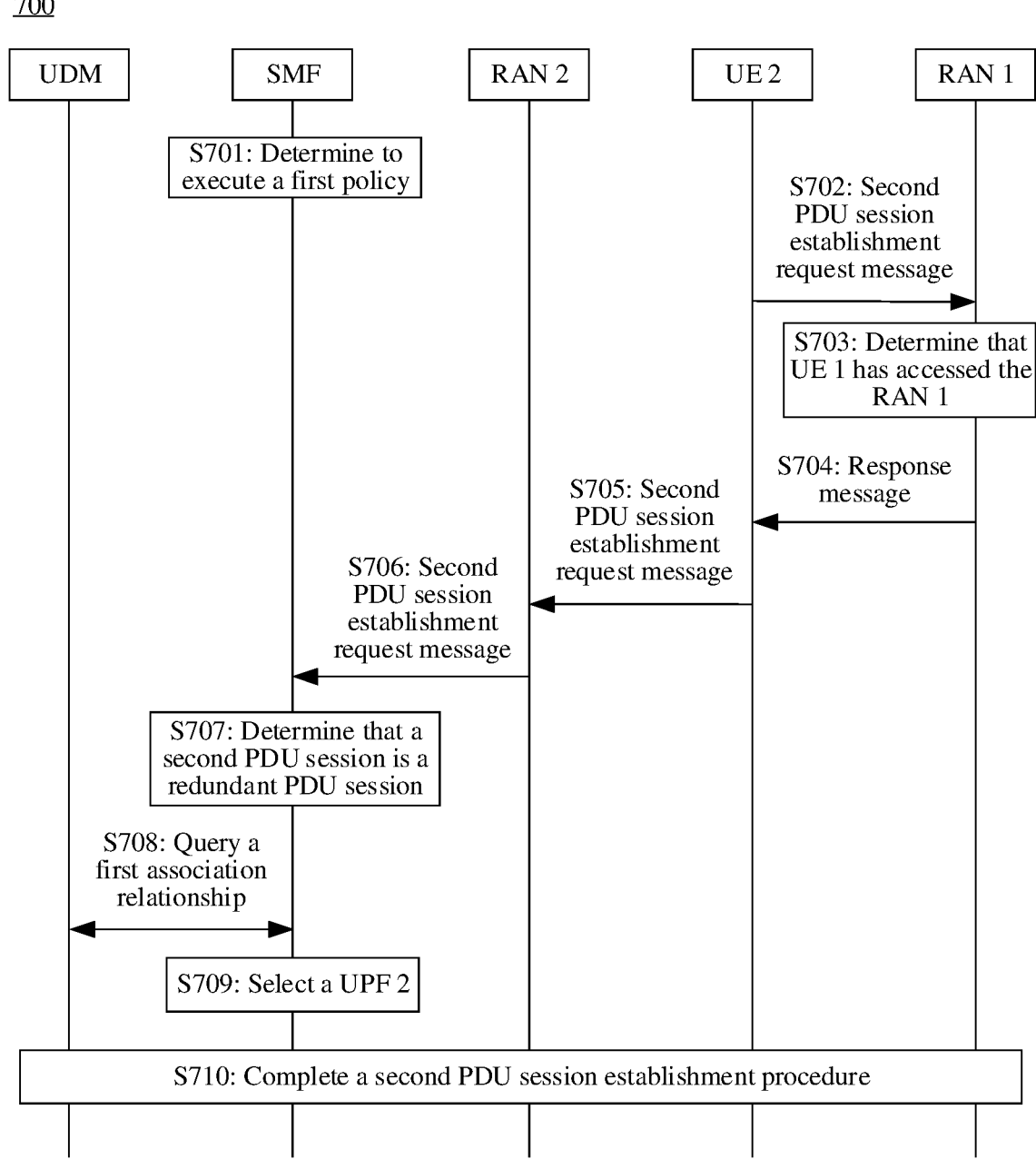
FIG. 7 is a schematic flowchart of a communication method according to still another embodiment of this application.

FIG. 7 is a schematic flowchart of the method 700 according to an embodiment of this application. For example, the method 700 may be performed after the method 600, and UE 2 in the method 700 may be, for example, redundant UE of the UE 1 in the method 600. It can be learned from FIG. 7 that the method 700 includes the following steps.

S701. An SMF determines a first policy.

It should be understood that S701 is similar to S601 in the method 600. For brevity, details are not described herein again in this application.

It should be further understood that if the method 700 is performed after the method 600, the procedure needs to be performed only once.

S702. The UE 2 sends a second PDU session establishment request message to a RAN 1.

For example, the UE 2 sends the second PDU session establishment request message to the RAN 1, where the second PDU session establishment request message is for requesting to establish a PDU session between the UE 2 and a data network DN.

S703. The RAN 1 determines that UE 1 has accessed the RAN 1.

For example, after receiving the second PDU session establishment request message from the UE 2, the RAN 1 determines, based on an ID of the UE 2 and a first mapping relationship, that redundant UE of the UE 2 is the UE 1. Further, the RAN 1 determines whether the UE 1 has accessed the RAN 1.

In a possible implementation, after the UE 1 establishes a first PDU session with the data network by using the RAN 1, a network device sends an identifier of the UE 1 to the RAN 1. For example, the SMF sends the identifier of the UE 1 to the RAN 1 by using an AMF. The identifier of the UE 1 indicates that the UE 1 has established the PDU session with the data network by using the RAN 1. The RAN 1 locally stores the identifier of the UE 1. After receiving the second PDU session establishment request message from the UE 2, the RAN 1 determines, based on the ID of the UE 2 and the first mapping relationship, that the redundant UE of the UE 2 is the UE 1, and then the RAN 1 queries whether the identifier of the UE 1 is locally stored. If the RAN 1 locally stores the identifier of the UE 1, the RAN 1 determines that the UE 1 has accessed the RAN 1. If the RAN 1 does not locally store the identifier of the UE 1, the RAN 1 determines that the UE 1 does not access the RAN 1. When the RAN 1 determines that the UE 1 has accessed the RAN 1, for example, in the method 600, the UE 1 accesses the 5G network by using the RAN 1. In this case, in S704, the RAN 1 sends a response message to the UE 2. The response message is for rejecting the second PDU session establishment request message.

S705. The UE 2 sends a second PDU session establishment request message to a RAN 2.

For example, after the UE 2 receives the response message sent by the RAN 1 in S704, and determines, based on the response message, that the RAN 1 rejects the second PDU session establishment request, the UE 2 sends the second PDU session establishment request message to the RAN 2. The second PDU session establishment request message is for requesting to establish a PDU session between the UE 2 and the data network. The RAN 2 is a RAN different from the RAN 1. To be specific, after receiving the response message that is from the RAN 1 and that is for rejecting the second PDU session establishment request message, the UE 2 sends a second PDU session establishment request message to a RAN other than the RAN 1.

In another possible implementation, S704 and S705 may be replaced with the following: The RAN 1 may directly send the second PDU session establishment request message to the RAN 2 through an Xn interface. To be specific, when the RAN 1 finds that the redundant UE of the UE 2 has accessed the RAN 1, the RAN 1 may forward the PDU session establishment request of the UE 2 to another RAN.

S706. The RAN 2 sends the second PDU session establishment request message to the SMF, where the second PDU session establishment request message is for requesting to establish the PDU session between the UE 2 and the data network DN.

It should be understood that S706 is similar to S608 in the method 600. A difference lies only in replacing the RAN 1 with the RAN 2, and replacing the first PDU session establishment request message with the second PDU session establishment request message. For brevity, details are not described herein again in this application.

S707. The SMF determines that a second PDU session is a redundant PDU session.

For example, the SMF receives the second PDU session establishment request message from the RAN 2 in S706. Optionally, the second PDU session establishment request message includes a second DNN, second S-NSSAI, a second 5QI, and address information of the UE 2. The second DNN identifies a data network that the UE 2 requests to access, the second S-NSSAI identifies a network slice that the UE 2 requests to access, and the second 5QI identifies a QoS feature of the second PDU session. The SMF determines, based on the ID of the UE 2 and the first mapping relationship, that the redundant UE of the UE 2 is the UE 1, and then the SMF requests UDM, based on the ID of the UE 2, to query information about a PDU session established by the UE 1, to determine whether a DNN, S-NSSAI, and a 5QI associated with the PDU session are the same as the second DNN, the second S-NSSAI, and the second 5QI, where UE associated with the PDU session is redundant UE of the UE 2, but address information of the UE associated with the PDU session is different from address information of the UE 2. If the foregoing case exists, the SMF determines that the second PDU session is the redundant PDU session.

Specifically, for example, based on the method 600, when the first DNN associated with the first PDU session is the same as the second DNN, the first S-NSSAI associated with the first PDU session is the same as the second S-NSSAI, the first 5QI associated with the first PDU session is the same as the second 5QI, but the address information of the UE 1 associated with the first PDU session is different from the address information of the UE 2, the SMF determines that the second PDU session is the redundant PDU session.

S708. The SMF queries a first association relationship.

For example, in S612 in the method 600, after the establishment of the first PDU session is completed, the UDM stores the first association relationship between the first identifier, the second identifier, and the third identifier. The SMF determines the first identifier of the UE 1 based on the first PDU session queried in S707, queries the UDM based on the first identifier for the first association relationship corresponding to the first identifier, and determines, based on the first identifier and the first association relationship, a UPF 1 identified by the third identifier.

S709. The SMF selects a UPF 2.

For example, the SMF determines, in S708, that a UPF accessed by the UE 1 in the first PDU session is the UPF 1, and the SMF selects the UPF 2 for the second PDU session based on the first policy, where the UPF 2 is a UPF different from the UPF 1. Therefore, the UE 1 and the UE 2 that are mutually redundant establish connections to the data network by using different UPFs.

S710. A network side completes a second PDU session establishment procedure.

It should be understood that a subsequent specific procedure for establishing the second PDU session is not limited in this application.

Figures 8, 9:
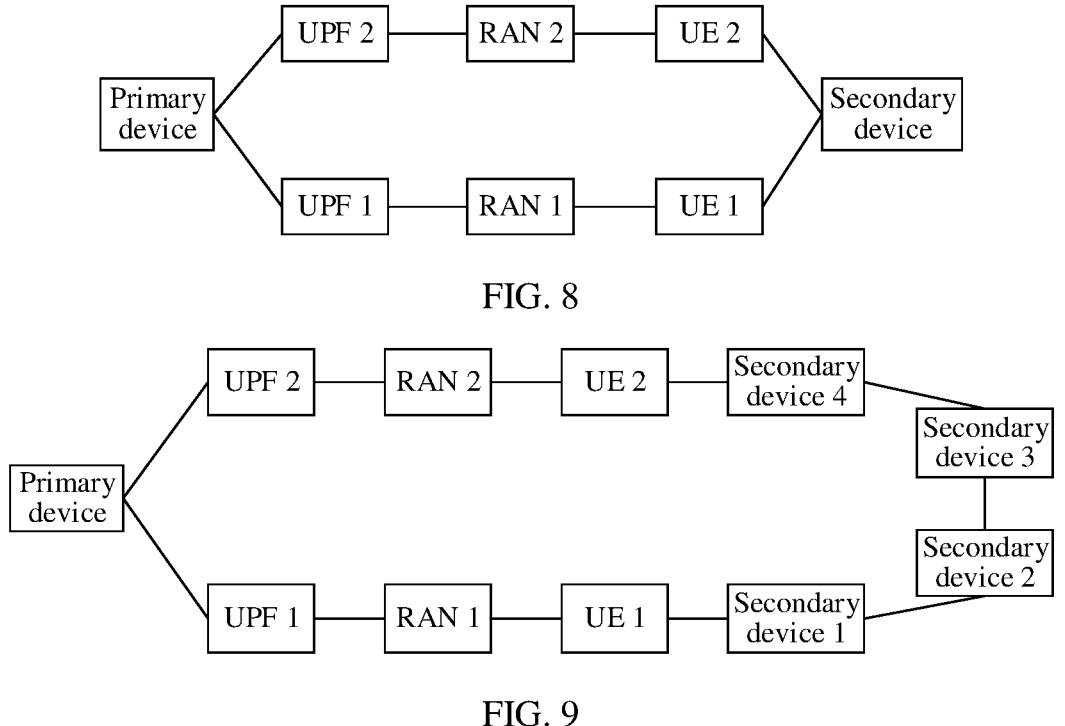
FIG. 8 is a schematic diagram of a redundant link according to an embodiment of this application.
FIG. 9 is a schematic diagram of a redundant link according to another embodiment of this application.

A redundant link between the primary device and the secondary device may be established according to the method 600 and the method 700. In links shown in FIG. 8, when both the primary device and the secondary device have the redundancy functionality, the network side allocates different RANs and UPFs to the UE 1 and the UE 2, so that two independent links are established between the primary device and the secondary device, and the primary device and the secondary device are responsible for duplicating and deduplicating a data packet.

In another example, when the primary device corresponds to a plurality of secondary devices Secondaries, the secondary devices may be connected in a chain manner, and secondary devices at two ends are respectively connected to two redundant UEs. For example, in links shown in FIG. 9, the primary device corresponds to four secondary devices. A secondary device 1 to a secondary device 4 are connected in a chain manner. The secondary device 1 and the secondary device 4 are respectively located at two ends of the chain link. One independent link includes the secondary device 1, the UE 1, the RAN 1, and the UPF 1, and the other one includes the secondary device 4, the UE 2, the RAN 2, and the UPF 2.

According to the foregoing procedure, two independent links can be established between the primary device and the secondary device. Further, the SMF obtains a service period of an industrial network by using the AF, sets a data reporting timer based on the service period, and sends the data reporting timer to the UPF 1 and the UPF 2. The UPF 1 and the UPF 2 count periodic service data packets of the PDU sessions, and report packet sequence numbers periodically based on the timer. The SMF detects link abnormality depending on whether the packet sequence numbers uploaded by the UPF 1 and UPF 2 are the same. When a link is abnormal, the SMF can report the abnormality in time by using the AF. According to the method in this embodiment, the link abnormality can be detected in time. This helps the network device locate a fault.

FIG. 10 is a schematic flowchart of the method 1000 according to an embodiment of this application. It can be learned from FIG. 10 that the method 1000 includes the following steps.

S1001. An SMF determines a second policy.

For example, the SMF determines the second policy, where the second policy includes allocating a same UPF and a same DS-TT port number to UE 3 and UE 4, and the UE 3 and the UE 4 are UEs that are mutually redundant.

It should be noted that the UE 3 and the UE 4 are two UEs that are mutually redundant. It may be understood as that the UE 3 and the UE 4 are two UEs that are connected to a same secondary device or a same group of Secondaries and transmit same data.

It should be further noted that, before S1001, the UE 3 and the UE 4 have completed a network registration procedure. In a possible implementation, the UE 3 and the UE 4 are bound to each other during network registration. For example, the UE 3 carries an identifier of the UE 4 during registration. In a network registration process of the UE 3 and the UE 4, or after the network registration is completed, a network device stores a redundancy relationship between the UE 3 and the UE 4. For example, the network device locally stores a second mapping relationship between an ID of the UE 3 and an ID of the UE 4, where the second mapping relationship may indicate that the UE 3 and the UE 4 are mutually redundant. In another possible implementation, the network device may actively obtain and store the redundancy relationship between the UE 3 and the UE 4. For example, in the network registration process of the UE 3 and the UE 4, or after the network registration is completed, the network device obtains the redundancy relationship between the UE 3 and the UE 4 from an application function AF by using a network exposure function NEF, and locally stores the redundancy relationship between the UE 3 and the UE 4.

In an example, the SMF determines whether a primary device and a secondary device have a redundancy functionality. When neither the primary device nor the secondary device has the redundancy functionality, the SMF determines the second policy.

It should be understood that, that neither the primary device nor the secondary device has the redundancy functionality may be understood as that neither the primary device nor the secondary device has a capability of performing redundancy backup, duplication, and deduplication on a data packet. For example, neither the primary device nor the secondary device supports an industrial redundancy protocol, for example, an MRP, a PRP, and HSR. In this embodiment, the primary device is deployed on a DN, and the secondary device is deployed on a UE side. The secondary device establishes connections to the UE 3 and the UE 4, and expects to access the DN by using the UE 3 and the UE 4 to communicate with the primary device.

Specifically, the AF determines, by using the primary device, whether the primary device and the secondary device have the redundancy functionality. For example, the AF sends a redundancy functionality query message to the primary device, and the primary device sends indication information to the AF based on the redundancy functionality query message, where the indication information indicates whether the primary device and the secondary device have the redundancy functionality. When neither the primary device nor the secondary device has the redundancy functionality, the AF sends, to a PCF, indication information indicating that neither the primary device nor the secondary device has the redundancy functionality. Further, the PCF sends indication information to the SMF to indicate that neither the primary device nor the secondary device has the redundancy functionality. The SMF determines, based on the indication information sent by the PCF, that neither the primary device nor the secondary device has the redundancy functionality. Therefore, the SMF determines the second policy.

In another example, the SMF determines the second policy based on an indication of the PCF.

Specifically, the AF determines, by using the primary device, whether the primary device and the secondary device have the redundancy functionality. When neither the primary device nor the secondary device has the redundancy functionality, the AF sends, to a PCF, indication information indicating that neither the primary device nor the secondary device has the redundancy functionality. After determining that neither the primary device nor the secondary device has the redundancy functionality, the PCF determines the second policy. Further, the PCF sends indication information to the SMF to indicate the SMF to determine the second policy. It should be understood that procedures in the foregoing two examples are similar to step S601 to step S604 in the method 600, except that in the method 600, both the primary device and the secondary device have the redundancy functionality. For brevity, the specific procedures are not shown in FIG. 10 in this application. It should be noted that, that neither the primary device nor the secondary device has the redundancy functionality indicates that the primary device and the secondary device cannot perform redundancy backup on data. Therefore, when the primary device and the secondary device communicate with each other by using a 5G network, a redundancy proxy needs to be performed inside the 5G network. To be specific, a network element inside the 5G network needs to perform a redundancy backup operation on data, to ensure reliability of data transmission. Therefore, when neither the primary device nor the secondary device has the redundancy functionality, the PCF or the SMF determines the second policy.

S1002. The SMF allocates a group identifier and a first DS-TT port number to the UE 3 and the UE 4.

For example, after determining the second policy, the SMF allocates the group identifier to the UE 3 and the UE 4, where the group identifier is for allocating a same UPF to sessions between the UE 3 and the DN and between the UE 4 and the DN, and the UPF is for duplicating and deduplicating data. The SMF sends the group identifier to UDM, and the UDM stores the group identifier, where the group identifier is associated with the ID of the UE 3 and the ID of the UE 4. Optionally, the SMF may further send the group identifier to the UE 3 and the UE 4.

For example, after determining the second policy, the SMF allocates a same DS-TT port number, for example, the first DS-TT port number, to the UE 3 and the UE 4. A first DS-TT port is for duplicating and deduplicating data. The SMF sends the first DS-TT port number to the UE 3 and the UE 4, and the UE 3 and the UE 4 are connected to the secondary device by using the first DS-TT port number.

It should be noted that one UE may have a plurality of redundant UEs. For example, UE 5 is also redundant UE of the UE 3, but the UE 5 is not redundant UE of the UE 4. To be specific, the UE 3 and the UE 4 are UE connected to a group of primary device and secondary device, and the UE 3 and the UE 5 are UE connected to another group of communication apparatuses. Therefore, one group identifier is allocated to the UE 3 and the UE 4, so that different UPFs can be conveniently allocated to sessions established by UE connected to the same group of primary device and secondary device without affecting other UE. It should be understood that if it is determined that redundant UE of the UE 3 is only the UE 4, and redundant UE of the UE 4 is only the UE 3, the group identifier may not need to be allocated.

S1003. The UE 3 sends a third PDU session establishment request message to a RAN 3.

For example, the UE 3 sends the third PDU session establishment request message to the RAN 3, where the third PDU session establishment request message is for requesting to establish a PDU session between the UE 3 and the data network DN.

S1004. The RAN 3 determines that the UE 4 does not access the RAN 3.

S1005. The RAN 3 sends the third PDU session establishment request message to the SMF.

It should be understood that S1004 and S1005 are similar to S607 and S608 in the method 600. A difference lies in that the UE 1 and the UE 2 are replaced with the UE 3 and the UE 4, the RAN 1 is replaced with the RAN 3, the first PDU session is replaced with a third PDU session, and the UPF 2 is replaced with a UPF 3. For brevity, details are not described herein again in this application. S1006. The SMF determines that the third PDU session is not a redundant PDU session.

For example, the third PDU session establishment request message includes a third DNN, third S-NSSAI, a third 5QI, the first DS-TT port number, and address information of the UE 3. The SMF determines, based on the ID of the UE 3 and the second mapping relationship, that the redundant UE of the UE 3 is the UE 4, and then the SMF requests the UDM, based on the ID of the UE 4, to query information about a PDU session of the UE 4, to determine whether a DNN, S-NSSAI, a 5QI, and a DS-TT port number associated with the PDU session are the same as the third DNN, the third S-NSSAI, the third 5QI, and the first DS-TT port number, where UE associated with the PDU session is redundant UE of the UE 3, but address information of the UE associated with the PDU session, that is, address information of the UE 4, is different from the address information of the UE 3. If the foregoing case exists, the SMF determines that the third PDU session is the redundant PDU session. Otherwise, the SMF determines that the third PDU session is not the redundant PDU session.

S1007. The SMF selects the UPF 3.

For example, when the SMF determines that the third PDU session is not the redundant PDU session, the SMF continues to perform a PDU session establishment procedure. For example, the SMF selects the UPF 3 to establish the third PDU session.

S1008. A network side completes a third PDU session establishment procedure.

It should be understood that a subsequent specific procedure for establishing the third PDU session is not limited in this application.

S1009. The UDM stores a second association relationship between the group identifier, a fourth identifier, a fifth identifier, and a sixth identifier.

For example, the UDM stores the second association relationship between the group identifier, the fourth identifier, the fifth identifier, and the sixth identifier in a process of establishing the third PDU session or after the establishment of the third PDU session is completed. The fourth identifier, the fifth identifier, and the sixth identifier are respectively identifiers of the UE 3, the RAN 3, and the UPF 3.

Figure 11:
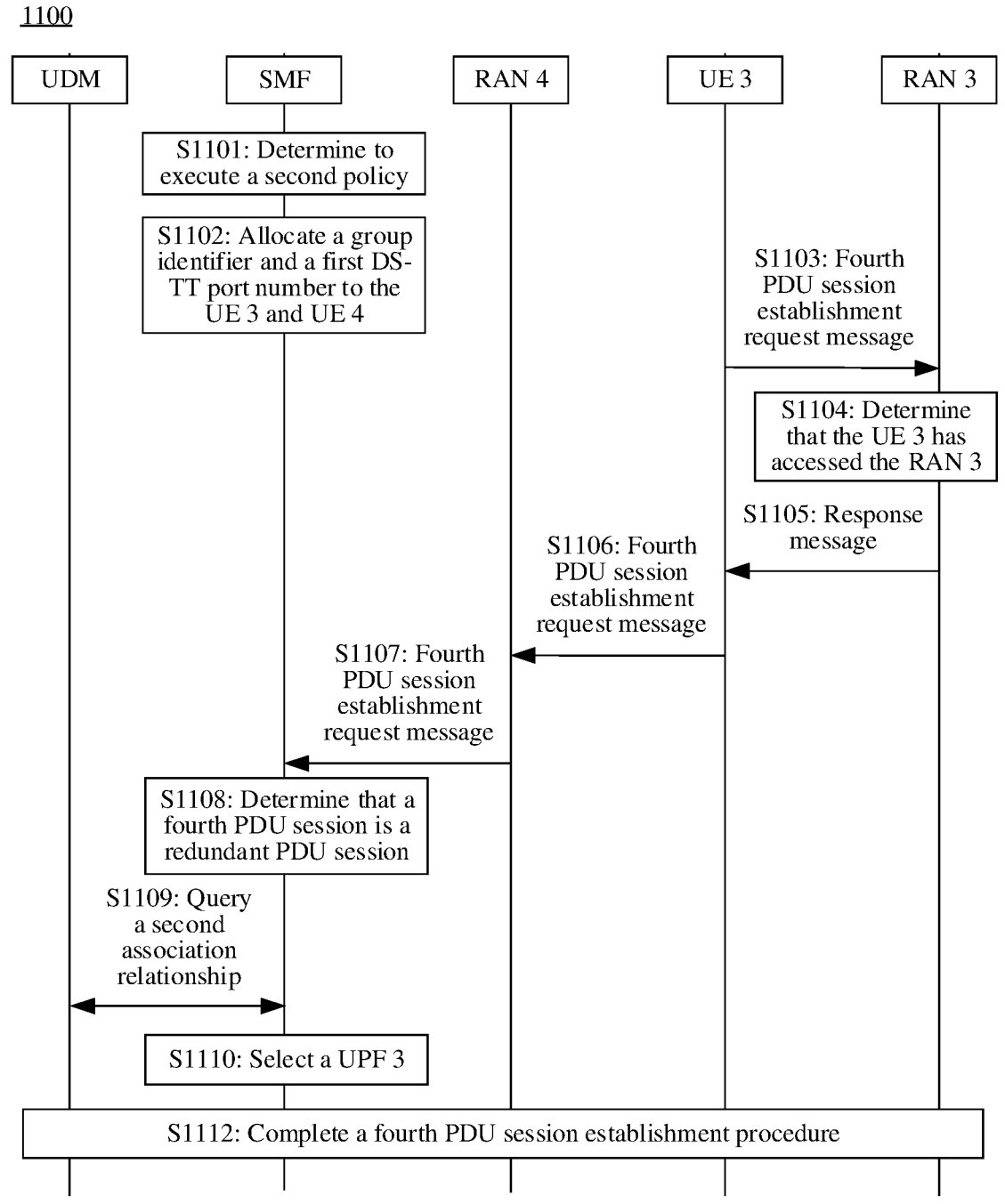
FIG. 11 is a schematic flowchart of a communication method according to still another embodiment of this application.

FIG. 11 is a schematic flowchart of the method 1100 according to an embodiment of this application. For example, the method 1100 may be performed after the method 1000, and UE 4 in the method 1100 may be, for example, redundant UE of the UE 3 in the method 1000. It can be learned from FIG. 11 that the method 1100 includes the following steps.

S1101. An SMF determines a second policy.

S1102. The SMF allocates a group identifier and a first DS-TT port number to UE 3 and the UE 4.

It should be understood that S1101 and S1102 are similar to S1001 and S1002 in the method 1000. For brevity, details are not described again in this application.

It should be further understood that if the method 1100 is performed after the method 1000, the procedure needs to be performed only once. To be specific, when S1001 and S1002 are performed, S1101 and S1102 may not need to be performed again.

S1103. The UE 3 sends a fourth PDU session establishment request message to a RAN 3, where the fourth PDU session establishment request message is for requesting to establish a PDU session between the UE 4 and a data network DN.

S1104: The RAN 3 determines that the UE 3 has accessed the RAN 3.

For example, after receiving the fourth PDU session establishment request message from the UE 3, the RAN 3 determines, based on an ID of the UE 3 and a second mapping relationship, that redundant UE of the UE 3 is the UE 4. Further, the RAN 3 determines whether the UE 3 has accessed the RAN 3.

When the RAN 3 determines that the UE 3 has accessed the RAN 3, for example, in the method 1000, the UE 3 accesses the 5G network by using the RAN 3. In this case, in S1105, the RAN 3 sends a response message to the UE 3. The response message is for rejecting the fourth PDU session establishment request message.

S1106. The UE 3 sends a fourth PDU session establishment request message to a RAN 4.

S1107. The RAN 4 sends the fourth PDU session establishment request message to the SMF.

It should be understood that S1106 and S1107 are similar to S705 and S706 in the method 700. A difference lies in that the UE 1 and the UE 2 are replaced with the UE 3 and the UE 4, the RAN 2 is replaced with the RAN 4, the first PDU session is replaced with a third PDU session, and the second PDU session is replaced with a fourth PDU session. For brevity, details are not described herein again in this application.

S1108. The SMF determines that the fourth PDU session is a redundant PDU session.

For example, the SMF receives the fourth PDU session establishment request message from the RAN 4 in S1107.

Optionally, the fourth PDU session establishment request message includes the first DS-TT port number, a fourth DNN, fourth S-NSSAI, a fourth 5QI, and address information of the UE 4. The SMF determines, based on an ID of the UE 4 and the second mapping relationship, that redundant UE of the UE 4 is the UE 3, and then the SMF requests UDM, based on the ID of the UE 3, to query information about a PDU session of the UE 3, to determine whether a DNN, S-NSSAI, a 5QI, and a DS-TT port number associated with the PDU session are the same as the fourth DNN, the fourth S-NSSAI, the fourth 5QI, and the first DS-TT port number, but address information of UE associated with the PDU session is different from the address information of the UE 4. If the foregoing case exists, the SMF determines that the fourth PDU session is the redundant PDU session.

Specifically, for example, based on the method 1000, when the third DNN associated with the third PDU session is the same as the fourth DNN, the third S-NSSAI associated with the third PDU session is the same as the fourth S-NSSAI, the third 5QI associated with the third PDU session is the same as the fourth 5QI, the first DS-TT port associated with the third PDU session is also a DS-TT port associated with the fourth PDU session, but the address information of the UE 3 associated with the third PDU session is different from the address information of the UE 4, the SMF determines that the fourth PDU session is the redundant PDU session.

S1109. The SMF queries a second association relationship.

For example, in S1009 in the method 1000, after the establishment of the third PDU session is completed, the UDM stores the second association relationship between the group identifier, the fourth identifier, the fifth identifier, and the sixth identifier. The SMF determines, in S1108, that the fourth PDU session is a redundant PDU session of the third PDU session, and then queries, based on the ID of the UE 4, the UDM for a group identifier associated with the ID of the UE 4. The SMF queries, based on the group identifier and the fourth identifier of the UE 3, the UDM for the second association relationship, and determines, based on the second association relationship, a UPF 3 identified by the fourth identifier.

S1110. The SMF selects the UPF 3.

For example, the SMF determines, in S1109, that a UPF accessed by the UE 3 in the third PDU session is the UPF 3, and the SMF selects the UPF 3 for the fourth PDU session based on the second policy.

S1112. A network side completes a fourth PDU session establishment procedure.

It should be understood that a subsequent specific procedure for establishing the fourth PDU session is not limited in this application.

According to the method 1000 and the method 1100, a redundant link between the primary device and the secondary device may be established, and an anchor UPF and an anchor DS-TT port are allocated to UEs that are mutually redundant, where the anchor UPF and the anchor DS-TT port are for implementing a redundancy proxy. That the redundancy proxy is performed through the anchor UPF and the anchor DS-TT port indicates that when the primary device and the secondary device do not have the redundancy functionality, the data packet is duplicated and deduplicated through the anchor UPF and the anchor DS-TT port to implement redundancy backup of the data. For example, the anchor UPF is for duplicating a downlink data packet or deduplicating an uplink data packet, and the anchor DS-TT port is for duplicating an uplink data packet or deduplicating a downlink data packet. For example, in links shown in FIG. 12, the UE 3 and the UE 4 are two UEs that are mutually redundant, and the UE 3 and the UE 4 are connected to a same DS-TT port, that is, the first DS-TT port. The first DS-TT port is for duplicating an uplink data packet or deduplicating a downlink data packet. The secondary device is connected to the UE 3 and the UE 4 through the first DS-TT port, and accesses a network by using the UE 3 and the UE 4. The UE 3 and the UE 4 are respectively connected to the RAN 3 and the RAN 4, the RAN 3 and the RAN 4 are connected to a same anchor UPF, that is, the UPF 3, and the UPF 3 is responsible for duplicating and deduplicating a data packet. The primary device is deployed in the DN and is connected to the UPF 3 by using the DN.

Figures 12, 13, 14, 15, 16:
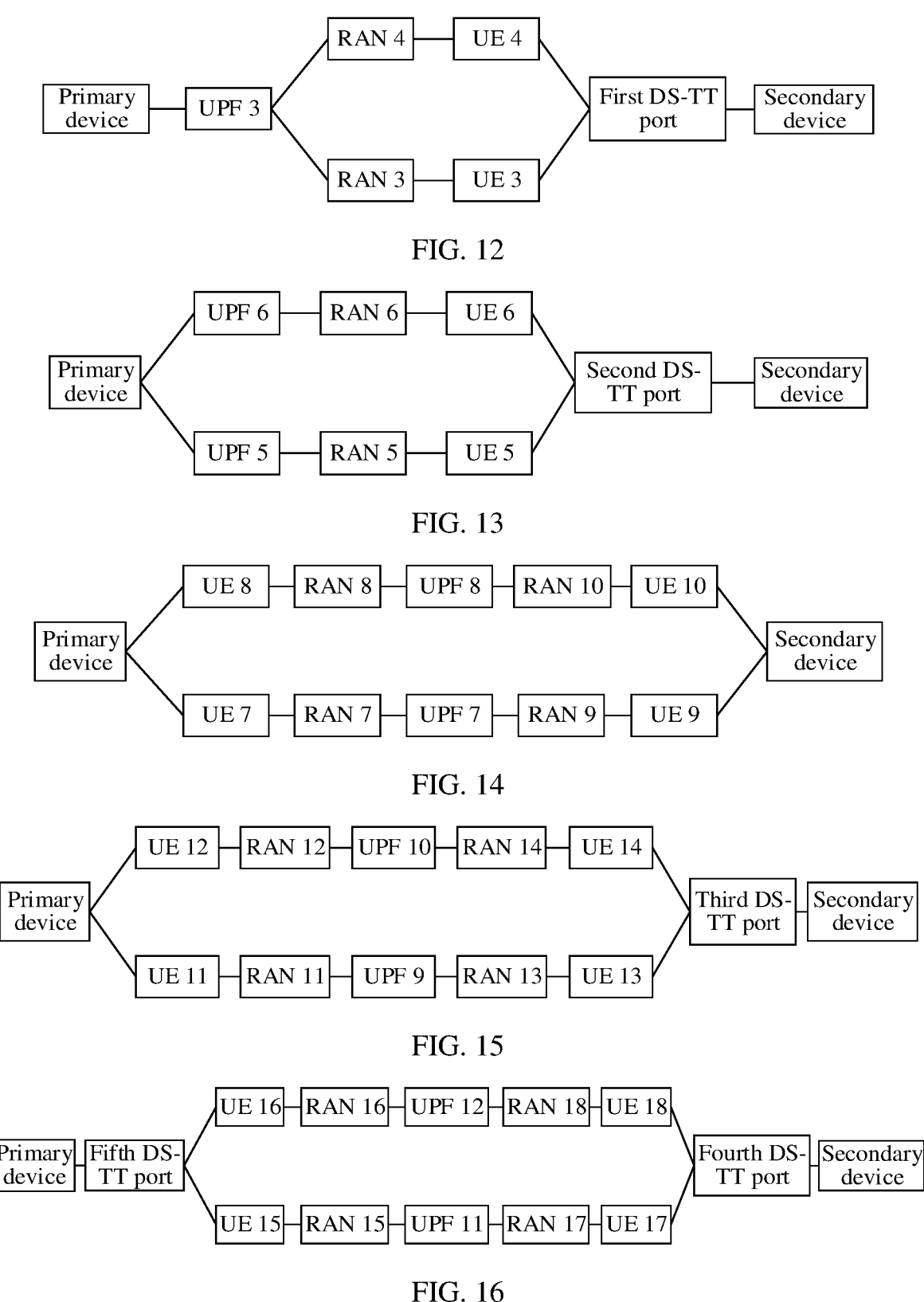
FIG. 12 is a schematic diagram of a redundant link according to still another embodiment of this application.
FIG. 13 is a schematic diagram of a redundant link according to still another embodiment of this application.
FIG. 14 is a schematic diagram of a redundant link according to still another embodiment of this application.
FIG. 15 is a schematic diagram of a redundant link according to still another embodiment of this application.
FIG. 16 is a schematic diagram of a redundant link according to still another embodiment of this application.

After the network side establishes the redundant links shown in FIG. 12, further, the SMF configures a duplication and deduplication rule for the UPF 3 and the first DS-TT port.

For example, the SMF delivers a first rule to the UPF 3, and the first rule indicates a manner in which the UPF 3 duplicates and deduplicates a data packet. For example, the SMF indicates, by using the first rule, the UPF 3 to duplicate a downlink data packet, and deduplicates an uplink data packet by adding an Ethernet data redundant header. Specifically, for example, according to the first rule, during downlink transmission, the UPF 3 duplicates a communication data packet on two links for simultaneous transmission. During uplink transmission, when receiving duplicate data packets from two ports, the UPF 3 discards a subsequent same data packet based on a redundant header. Alternatively, the SMF indicates, by using the first rule, the UPF 3 to duplicate the downlink data packet, and deduplicates the uplink data packet by adding a packet trailer redundancy domain. Specifically, for example, according to the first rule, during downlink transmission, the UPF 3 duplicates a communication data packet on two links for simultaneous transmission. During uplink transmission, when receiving duplicate data packets from two ports, the UPF 3 may perform deduplication based on a redundancy domain at a packet tail. The duplication and deduplication manner is not limited in this application.

For example, the SMF delivers a second rule to the first DS-TT port, and the second rule indicates a manner in which the first DS-TT port duplicates and deduplicates a data packet and data to be duplicated and deduplicated. For example, the SMF sends the second rule to the first DS-TT port. The second rule includes the address information of the UE 3 and the UE 4, the ID of the third PDU session, and the ID of the fourth PDU session, and indicates the first DS-TT to duplicate uplink data and deduplicate downlink data. The duplication and deduplication manner is not limited in this application.

In another embodiment, when a primary device has a redundancy functionality but a secondary device does not have a redundancy functionality, an SMF determines a third policy, where the third policy includes allocating different UPFs and a same DS-TT port number to UE 5 and UE 6. The UE 5 and the UE 6 are two UEs that are mutually redundant. For example, in links shown in FIG. 13, the UE 5 and the UE 6 are connected to a same DS-TT port, that is, a second DS-TT port, and the second DS-TT port is responsible for duplicating and deduplicating a data packet. The secondary device is connected to the UE 5 and the UE 6 through the second DS-TT port, and accesses a network by using the UE 5 and the UE 6. The UE 5 and the UE 6 are respectively connected to a RAN 5 and a RAN 6, the RAN 5 and the RAN 6 are respectively connected to a UPF 5 and a UPF 6, and the UPF 5 and the UPF 6 are connected to a DN in which the primary device is located. The primary device deployed on the DN is responsible for duplicating and deduplicating a data packet.

It should be understood that a solution in which the SMF allocates different UPFs to the UE 5 and the UE 6 is similar to a related solution in the method 600 and the method 700. Details are not described herein again in this application. A solution in which the SMF allocates the same DS-TT port number to the UE 5 and the UE 6 is similar to a related solution in the method 1000 and the method 1100. Details are not described herein again in this application. A solution of allocating different RANs to the UE 5 and the UE 6 is similar to a related solution in the method 600, the method 700, the method 1000, and the method 1100. Details are not described herein again in this application.

It should be understood that the method 600, the method 700, the method 1000, and the method 1100 are described by using only two redundant links as an example. However, this application is not limited thereto. For example, three or more redundant links may be used to ensure data reliability. A specific solution is similar, and details are not described in this application again. It should be understood that, in the foregoing embodiments, an example in which the primary device is deployed on the data network DN, and the secondary device is deployed on the UE side is used for description. However, both the primary device and the secondary device may be deployed on the UE side.

It should be further understood that in the redundant links established according to the method 600, the method 700, the method 1000, and the method 1100, a UPF may be first connected to an intermediate user plane function I-UPF, and then connected to a RAN. For example, in the redundant links shown in FIG. 13, the UPF 6 may be connected to different I-UPFs through a redundant N9 interface, and then connected to the RAN 6 through a redundant N3 interface.

In an example, when both the primary device and the secondary device are deployed on the UE side, and both the primary device and the secondary device have the redundancy functionality, redundant links shown in FIG. 14 may be established between the primary device and the secondary device. It can be learned from FIG. 14 that the primary device accesses a network by using UE 7 and UE 8, and the UE 7 and the UE 8 are mutually redundant. The secondary device accesses the network by using UE 9 and UE 10, and the UE 9 and the UE 10 are mutually redundant. On a network side, two redundant links are established between the primary device and the secondary device, that is, "primary device-UE 7-RAN 7-UPF 7-RAN 9-UE 9-secondary device" and "primary device-UE 8-RAN 8-UPF 8-RAN 10-UE 10-secondary device". The primary device and the secondary device are responsible for duplicating and deduplicating data on two sides of the links.

It should be noted that communication between the UE 7 and the UE 9 may be completed in a 5G LAN manner, and the UE 7 and the UE 9 are configured in a same 5G LAN VN group by using an AF. The UE 7 and the UE 9 select a same UPF 7 when establishing PDU sessions, and a forwarding rule from the UE 7 to the UE 9 is established in the UPF 7. Communication between the UE 8 and the UE 10 may also be established according to similar method, and details are not described again.

It should be further noted that the UE 7 and the UE 8 may be the same as the UE 9 and the UE 10. To be specific, the primary master device and the secondary device may access the network by using two same UEs.

In another example, when both the primary device and the secondary device are deployed on the UE side, and the primary device has the redundancy functionality, but the secondary device does not have the redundancy functionality, redundant links shown in FIG. 15 may be established between the primary device and the secondary device. It can be learned from FIG. 15 that the primary device accesses the network by using UE 11 and UE 12, and the UE 11 and the UE 12 are mutually redundant. The secondary device accesses the network by using UE 13 and UE 14, the UE 13 and the UE 14 are mutually redundant, and the UE 13 and the UE 14 are connected to the secondary device through a same third DS-TT port. The primary device and the third DS-TT port are responsible for duplicating and deduplicating data on two sides of the links. It should be noted that communication between the UE 11 and the UE 13 and communication between the UE 12 and the UE 14 may also be completed in the 5G LAN manner, and details are not described herein again. It should be further noted that the UE 11 and the UE 12 may be the same as the UE 13 and the UE 14. To be specific, the primary master device and the secondary device may access the network by using two same UEs.

In still another example, when both the primary device and the secondary device are deployed on the UE side, and neither the primary device nor the secondary device has the redundancy functionality, redundant links shown in FIG. 16 may be established between the primary device and the secondary device. It can be learned from FIG. 16 that the primary device accesses the network by using UE 15 and UE 16, the UE 15 and the UE 16 are mutually redundant, and the UE 15 and the UE 16 are connected to the primary device through a same fifth DS-TT port. The secondary device accesses the network by using UE 17 and UE 18, the UE 17 and the UE 18 are mutually redundant, and the UE 17 and the UE 18 are connected to the secondary device through a same fourth DS-TT port. The fifth DS-TT port and the fourth DS-TT port are responsible for duplicating and deduplicating data on two sides of the links. It should be noted that communication between the UE 15 and the UE 17 and communication between the UE 16 and the UE 18 may also be completed in the 5G LAN manner, and details are not described herein again. It should be further noted that the UE 15 and the UE 16 may be the same as the UE 17 and the UE 18. To be specific, the primary master device and the secondary device may access the network by using two same UEs.

The foregoing describes in detail the methods provided in embodiments of this application with reference to FIG. 5 to FIG. 16. The following describes in detail communication apparatuses provided in embodiments of this application with reference to FIG. 17 to FIG. 19.

Figure 17:
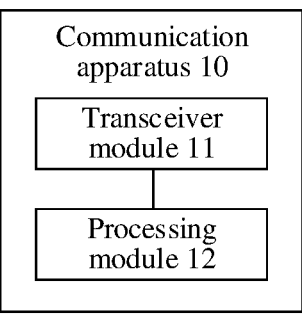
FIG. 17 is a schematic block diagram of a communication apparatus according to an embodiment of this application.

FIG. 17 is a schematic block diagram of a communication apparatus according to an embodiment of this application. As shown in the figure, the communication apparatus 10 may include a transceiver module 11 and a processing module 12.

In a possible design, the communication apparatus 10 may correspond to the session management network element or the SMF in the foregoing method embodiments.

For example, the communication apparatus 10 may correspond to the session management network element or the SMF in the method 500 to the method 700, the method 1000, and the method 1100 according to embodiments of this application. The communication apparatus 10 may include a module configured to perform the method performed by the session management network element or the SMF in the method 500 in FIG. 5, the method 600 in FIG. 6, the method 700 in FIG. 7, the method 1000 in FIG. 10, or the method 1100 in FIG. 11. In addition, units in the communication apparatus 10 and the foregoing other operations and/or functions are respectively for implementing corresponding procedures of the method 500 to the method 700, the method 1000, and the method 1100.

The transceiver module 11 in the communication apparatus 10 performs receiving and sending operations performed by the network device, for example, the SMF in the foregoing method embodiments, and the processing module 12 performs an operation other than the receiving and sending operations.

Figure 18:
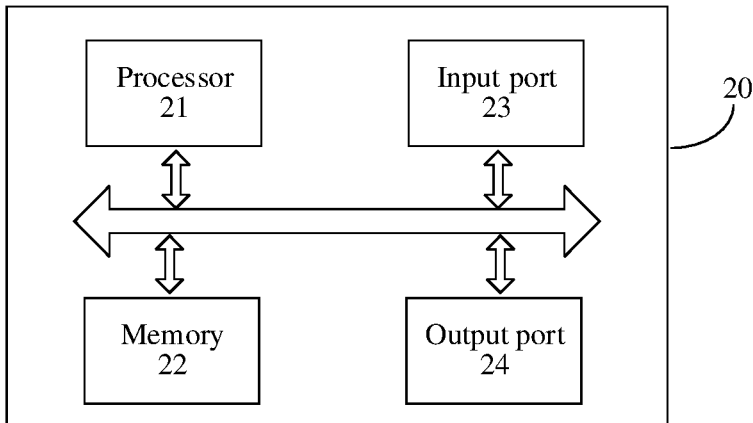
FIG. 18 is a schematic block diagram of a communication apparatus according to another embodiment of this application.

According to the foregoing method, FIG. 18 is a schematic diagram of a communication apparatus 20 according to an embodiment of this application. As shown in FIG. 18, the apparatus 20 may be a network device, including a session management network element, for example, an SMF.

The apparatus 20 may include a processor 21 (that is, an example of a processing module) and a memory 22. The memory 22 is configured to store instructions, and the processor 21 is configured to execute the instructions stored in the memory 22, so that the apparatus 20 implements steps performed in the methods corresponding to FIG. 5 to FIG. 16.

Further, the apparatus 20 may further include an input port 23 (that is, an example of a transceiver module) and an output port 24 (that is, another example of the transceiver module). Further, the processor 21, the memory 22, the input port 23, and the output port 24 may communicate with each other through an internal connection path, to transmit a control and/or data signal. The memory 22 is configured to store a computer program. The processor 21 may be configured to invoke and run the computer program from the memory 22, to control the input port 23 to receive a signal, control the output port 24 to send a signal, so that steps of the network device in the foregoing method are completed. The memory 22 may be integrated into the processor 21, or may be disposed separately from the processor 21.

Optionally, if the communication apparatus 20 is a communication device, the input port 23 is a receiver, and the output port 24 is a transmitter. The receiver and the transmitter may be a same physical entity or different physical entities. When the receiver and the transmitter are the same physical entity, the receiver and the transmitter may be collectively referred to as a transceiver.

Optionally, if the communication apparatus 20 is a chip or a circuit, the input port 23 is an input interface, and the output port 24 is an output interface.

In an implementation, it may be considered that functions of the input port 23 and the output port 24 are implemented by using a transceiver circuit or a dedicated transceiver chip. It may be considered that the processor 21 is implemented by using a dedicated processing chip, a processing circuit, a processor, or a general-purpose chip.

In another implementation, it may be considered that the communication apparatus provided in this embodiment of this application is implemented by using a general-purpose computer. To be specific, program code for implementing functions of the processor 21, the input port 23, and the output port 24 is stored in the memory 22, and the general-purpose computer implements the functions of the processor 21, the input port 23, and the output port 24 by executing the code in the memory 22.

Modules or units in the communication apparatus 20 may be configured to perform actions or processing processes performed by an SL carrier management device (that is, a base station) in the foregoing method. To avoid repetition, detailed descriptions are omitted herein.

For concepts, explanations, detailed descriptions, and other steps that are related to the technical solutions provided in embodiments of this application and that are in the apparatus 20, refer to descriptions of the content in the foregoing methods or other embodiments. Details are not described herein again.

Figure 19:
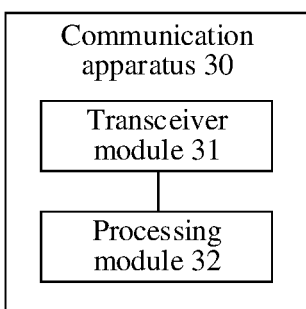
FIG. 19 is a schematic block diagram of a communication apparatus according to still another embodiment of this application.

FIG. 19 is a schematic block diagram of a communication apparatus according to an embodiment of this application. As shown in the figure, the communication apparatus 30 may include a transceiver module 31 and a processing module 32. For example, the communication apparatus 30 in FIG. 19 may correspond to the radio access network device, the RAN, or the base station in the method 500 to the method 1100 according to embodiments of this application. The communication apparatus 30 may include a module configured to perform the method performed by the radio access network device or the RAN in the method 500 in FIG. 5, the method 600 in FIG. 6, the method 700 in FIG. 7, the method 1000 in FIG. 10, or the method 1100 in FIG. 11. In addition, units in the communication apparatus 30 and the foregoing other operations and/or functions are respectively for implementing corresponding procedures of the method 500 to the method 1100.

The transceiver module 31 in the communication apparatus 30 performs receiving and sending operations performed by the network device, for example, the radio access network device or the RAN in the foregoing method embodiments, and the processing module 32 performs an operation other than the receiving and sending operations.

Figure 20:
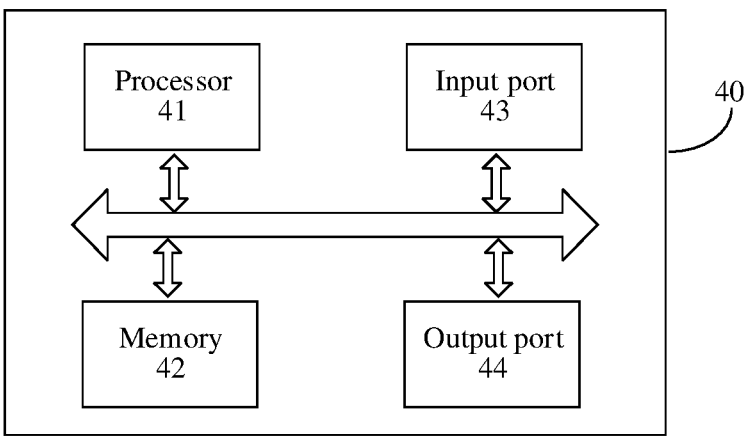
FIG. 20 is a schematic block diagram of a communication apparatus according to still another embodiment of this application.

According to the foregoing method, FIG. 20 is a schematic diagram of a communication apparatus 40 according to an embodiment of this application. The communication apparatus 40 may be a radio access network device, a RAN, or the like. The apparatus 40 may include a processor 41 (which may also be understood as an example of a processing module), and may further include a memory 42. The memory 42 is configured to store instructions, and the processor 41 is configured to execute the instructions stored in the memory 42, so that the apparatus 40 implements steps performed by the communication apparatus in the methods corresponding to FIG. 5 to FIG. 11.

A structure of the apparatus 40 is similar to that of the apparatus 20, and details are not described again.

For concepts, explanations, detailed descriptions, and other steps that are related to the technical solutions provided in embodiments of this application and that are in the apparatus 40, refer to descriptions of the content in the foregoing methods or other embodiments. Details are not described herein again.

Figure 21:
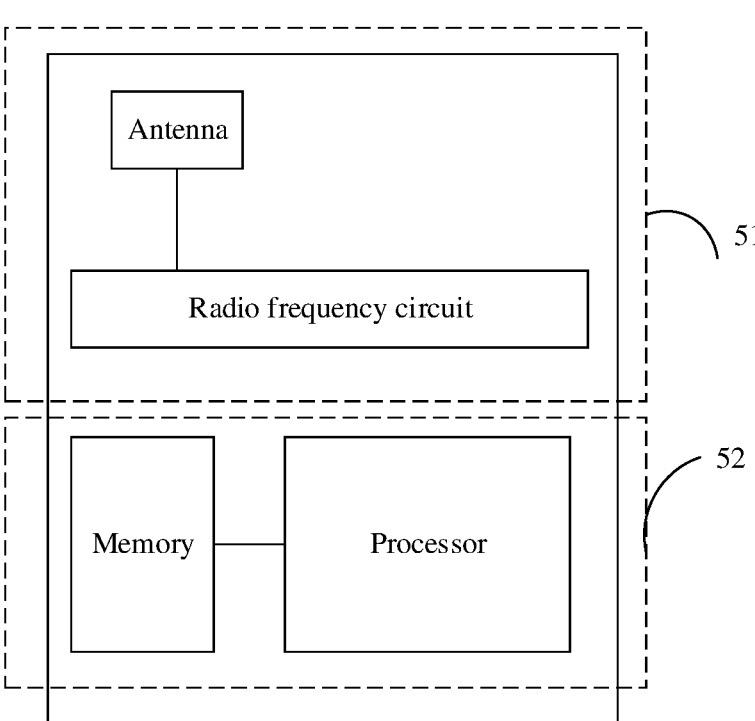
FIG. 21 is a schematic block diagram of a communication apparatus according to still another embodiment of this application.

FIG. 21 is a schematic diagram of a simplified structure of a network device. The network device includes a part 51 and a part 52. The part 51 is mainly for sending and receiving a radio frequency signal and performing conversion between the radio frequency signal and a baseband signal. The part 52 is mainly for performing baseband processing, controlling the network device, and the like. The part 51 may be usually referred to as a transceiver module, a transceiver machine, a transceiver circuit, a transceiver, or the like. The part 52 is usually a control center of the network device, may be usually referred to as a processing module, and is configured to control the network device to perform a processing operation on the network device side in the foregoing method embodiments.

The transceiver module in the part 51 may also be referred to as a transceiver machine, a transceiver, or the like, and includes an antenna and a radio frequency circuit. The radio frequency circuit is mainly configured to perform radio frequency processing. For example, a component configured to implement a receiving function in the part 51 may be considered as a receiving module, and a component configured to implement a sending function may be considered as a sending module. To be specific, the part 51 includes the receiving module and the sending module. The receiving module may also be referred to as a receiver machine, a receiver, a receiver circuit, or the like, and the sending module may be referred to as a transmitter machine, a transmitter, a transmitter circuit, or the like.

The part 52 may include one or more boards, and each board may include one or more processors and one or more memories. The processor is configured to read and execute a program in the memory to implement a baseband processing function and control the network device. If there are a plurality of boards, the boards may be interconnected to improve a processing capability. In an optional implementation, alternatively, the plurality of boards may share one or more processors, the plurality of boards may share one or more memories, or the plurality of boards may simultaneously share one or more processors.

For example, in an implementation, the transceiver module in the part 51 is configured to perform steps related to sending and receiving of the session management network element or the SMF in FIG. 5 to FIG. 10. The part 52 is for performing steps related to processing of the session management network element or the SMF in FIG. 2 to FIG. 10.

For another example, in another implementation, the transceiver module in the part 51 is configured to perform steps related to sending and receiving of the radio access network device or the RAN in FIG. 5 to FIG. 11. The part 52 is for performing steps related to processing of the radio access network device or the RAN in FIG. 5 to FIG. 11.

It should be understood that FIG. 21 is merely an example instead of a limitation. The network device including the transceiver module and the processing module may not depend on the structure shown in FIG. 21.

When the apparatus 50 is a chip, the chip includes a transceiver module and a processing module. The transceiver module may be an input/output circuit or a communication interface. The processing module is a processor, a microprocessor, or an integrated circuit integrated on the chip.

An embodiment of this application further provides a computer-readable storage medium. The computer-readable storage medium stores computer instructions for implementing the method performed by the network device in the foregoing method embodiments.

For example, when the computer instructions are executed by a computer, the computer is enabled to implement the method performed by the network device in the foregoing method embodiments.

An embodiment of this application further provides a computer program product including instructions. When the instructions are executed by a computer, the computer is enabled to implement the method performed by the first terminal device or the method performed by the second terminal device in the foregoing method embodiments.

An embodiment of this application further provides a communication system. The communication system includes the network device in the foregoing embodiments.

For explanations and beneficial effects of related content in any apparatus provided above, refer to the corresponding method embodiment provided above. Details are not described herein again.

In embodiments of this application, the network device may include a hardware layer, an operating system layer running above the hardware layer, and an application layer running above the operating system layer. The hardware layer may include hardware, for example, a central processing unit (CPU), a memory management unit (MMU), and a memory (also referred to as a main memory). An operating system at the operating system layer may be any one or more computer operating systems that implement service processing through a process, for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be a network device or a function module that can invoke and execute a program in the network device.

Aspects or features of this application may be implemented as a method, an apparatus, or a product that uses standard programming and/or engineering technologies. The term "product" used in this specification may cover a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive).

Various storage media described in this specification may indicate one or more devices and/or other machine-readable media that are configured to store information. The term "machine-readable media" may include but is not limited to a wireless channel, and various other media that can store, include, and/or carry instructions and/or data.

It should be understood that the processor mentioned in embodiments of this application may be a central processing unit (CPU), another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The nonvolatile memory may be a read-only memory (read-only memory, ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. As an example instead of a limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA, or another programmable logic device, discrete gate or transistor logic device, or discrete hardware component, the memory (a storage module) may be integrated into the processor.

It should be further noted that the memory described in this specification is intended to include but not limited to these memories and any memory of another appropriate type.

A person of ordinary skill in the art may be aware that, in combination with the examples described in embodiments disclosed in this specification, units and steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a detailed working process of the foregoing described apparatus and unit, refer to a corresponding process in the foregoing method embodiments. Details are not described herein again.

In several embodiments provided in this application, it should be understood that the disclosed apparatus and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the solutions provided in this application.

In addition, function units in embodiments of this application may be integrated into one unit, each of the units may exist alone physically, or two or more units may be integrated into one unit.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like. For example, the usable medium may include but is not limited to any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:

1. A method, comprising:
determining, by a session management network element, whether a first communication apparatus and a second communication apparatus have a redundancy functionality;
receiving, by the session management network element, a session establishment request message from a first terminal device, wherein the session establishment request message requests to establish a first session between the first terminal device and a data network;
when it is determined that both the first communication apparatus and the second communication apparatus have the redundancy functionality, and the first session is a redundant session, selecting, by the session management network element, a first user plane function network element to establish the first session, wherein the first user plane function network element is different from a second user plane function network element, the second user plane function network element is configured to establish a second session, the first session is a redundant session of the second session, and the first session and the second session are configured for communication between the first communication apparatus and the second communication apparatus; and when it is determined that the first communication apparatus does not have the redundancy functionality, and the first session is the redundant session, selecting, by the session management network element, the second user plane function network element to establish the first session, and allocating, by the session management network element, a first port to both the first terminal device and a second terminal device, wherein the second communication apparatus is connected to the first terminal device through the first port, and the second communication apparatus is connected to the second terminal device through the first port.

2. The method according to claim 1, wherein the first port comprises a DS-TT port.

3. The method according to claim 1, further comprising:
sending, by the session management network element, a second rule to the first port, wherein the second rule is configured for duplicating uplink data packets in the first session and the second session or deduplicating downlink data packets in the first session and the second session.

4. The method according to claim 1, further comprising:
sending, by the session management network element to a data management network element, a first mapping relationship between an identifier of the first terminal device and an identifier of the first user plane function network element.

5. The method according to claim 1, further comprising:
when a first data network name (DNN) is the same as a second DNN, first single network slice selection assistance information (S-NSSAI) is the same as second S-NSSAI, a first 5G quality of service identifier (5QI) is the same as a second 5QI, the first terminal device and the second terminal device connected to the second communication apparatus are mutually redundant, and address information of the first terminal device is different from address information of the second terminal device, determining, by the session management network element, that the first session is the redundant session, wherein the first DNN, the first S-NSSAI, and the first 5QI are associated with the first session, and the second DNN, the second S-NSSAI, and the second 5QI are associated with the second session.

6. The method according to claim 1, further comprising:
sending, by the session management network element, a first rule to the second user plane function network element, wherein the first rule is configured for duplicating downlink data packets in the first session and the second session or deduplicating uplink data packets in the first session and the second session.

7. The method according to claim 1, wherein determining, by the session management network element, whether the first communication apparatus and the second communication apparatus have the redundancy functionality comprises:
obtaining, by the session management network element from a policy control function network element, information indicating whether the first communication apparatus has the redundancy functionality, and whether the second communication apparatus has the redundancy functionality.

8. The method according to claim 1, wherein the session establishment request message comprises a first identifier, the first identifier is associated with a second identifier, the first identifier identifies the first terminal device, and the second identifier identifies the second terminal device con-
nected to the second communication apparatus.

9. An apparatus, comprising:

at least one processor; and a non-transitory memory storing a program that is execut-
able by the at least one processor, the program includ-
ing instructions to:

determine whether a first communication apparatus and
a second communication apparatus have a redun-
dancy functionality; and receive a session establishment request message from a
first terminal device, wherein the session establish-
ment request message requests to establish a first
session between the first terminal device and a data
network; and when it is determined that both the first communication
apparatus and the second communication apparatus
have the redundancy functionality, and the first ses-
sion is a redundant session, select a first user plane
function network element to establish the first ses-
sion, wherein the first user plane function network
element is different from a second user plane func-
tion network element, the second user plane function
network element is configured to establish a second
session, the first session is a redundant session of the
second session, and the first session and the second
session are configured for communication between
the first communication apparatus and the second
communication apparatus; and when it is determined that the first communication appa-
ratus does not have the redundancy functionality, and
the first session is the redundant session, select the
second user plane function network element to estab-
lish the first session, and allocate a first port to both the
first terminal device and a second terminal device,
wherein the second communication apparatus is con-
nected to the first terminal device through the first port,
and the second communication apparatus is connected
to the second terminal device through the first port.

10. The apparatus according to claim 9, wherein the first
port comprises a DS-TT port.

11. The apparatus according to claim 9, wherein the
program further includes instructions to:

send a first mapping relationship between an identifier of
the first terminal device and an identifier of the first user
plane function network element to a data management
network element.

12. The apparatus according to claim 9, wherein the
program further includes instructions to:

when a first data network name (DNN) is the same as a
second DNN, first single network slice selection assis-
tance information (S-NSSAI) is the same as second
S-NSSAI, a first 5G quality of service identifier (5QI)
is the same as a second 5QI, the first terminal device
and the second terminal device connected to the second
communication apparatus are mutually redundant, and
address information of the first terminal device is
different from address information of the second ter-
minal device, determine that the first session is the
redundant session, wherein the first DNN, the first
S-NSSAI, and the first 5QI are associated with the first
session, and the second DNN, the second S-NSSAI,
and the second 5QI are associated with the second
session.

13. The apparatus according to claim 9, wherein the
program further includes instructions to:

send a second rule to the first port, wherein the second rule
is configured for duplicating uplink data packets in the
first session and the second session or deduplicating
downlink data packets in the first session and the
second session.

14. A non-transitory computer readable storage medium
storing instructions that are executable by at least one
processor, wherein execution of the instructions causes a
session management network element to:

determine whether a first communication apparatus and a
second communication apparatus have a redundancy
functionality;

receive a session establishment request message from a
first terminal device, wherein the session establishment
request message requests to establish a first session
between the first terminal device and a data network;

when it is determined that both the first communication
apparatus and the second communication apparatus
have the redundancy functionality, and the first session
is a redundant session, select a first user plane function
network element to establish the first session, wherein
the first user plane function network element is differ-
ent from a second user plane function network element,
the second user plane function network element is
configured to establish a second session, the first ses-
sion is a redundant session of the second session, and
the first session and the second session are configured
for communication between the first communication
apparatus and the second communication apparatus;
and when it is determined that the first communication appa-
ratus does not have the redundancy functionality, and
the first session is the redundant session, select the
second user plane function network element to estab-
lish the first session, and allocate a first port to both the
first terminal device and a second terminal device,
wherein the second communication apparatus is con-
nected to the first terminal device through the first port,
and the second communication apparatus is connected
to the second terminal device through the first port.

15. The non-transitory computer readable storage medium
according to claim 14, wherein the first port comprises a
DS-TT port.

16. The non-transitory computer readable storage medium
according to claim 15, wherein execution of the instructions
causes the session management network element further to:

when a first data network name (DNN) is the same as a
second DNN, first single network slice selection assis-
tance information (S-NSSAI) is the same as second
S-NSSAI, a first 5G quality of service identifier (5QI)
is the same as a second 5QI, the first terminal device
and the second terminal device connected to the second
communication apparatus are mutually redundant, and
address information of the first terminal device is
different from address information of the second ter-
minal device, determine that the first session is the
redundant session, wherein the first DNN, the first
S-NSSAI, and the first 5QI are associated with the first
session, and the second DNN, the second S-NSSAI,
and the second 5QI are associated with the second
session.

17. The non-transitory computer readable storage medium
according to claim 15, wherein execution of the instructions
causes the session management network element further to:

send a first rule to the second user plane function network
element, wherein the first rule is configured for dupli-
cating downlink data packets in the first session and the second session or deduplicating uplink data packets in the first session and the second session.

18. The non-transitory computer readable storage medium according to claim 15, wherein determining whether the first communication apparatus and the second communication apparatus have the redundancy functionality comprises:

obtaining, from a policy control function network element, information indicating whether the first communication apparatus has the redundancy functionality, and whether the second communication apparatus has the redundancy functionality.

19. The non-transitory computer readable storage medium according to claim 14, wherein execution of the instructions causes the session management network element further to:

send a second rule to the first port, wherein the second rule is configured for duplicating uplink data packets in the first session and the second session or deduplicating downlink data packets in the first session and the second session.

20. The non-transitory computer readable storage medium according to claim 14, wherein execution of the instructions causes the session management network element further to:

send, to a data management network element, a first mapping relationship between an identifier of the first terminal device and an identifier of the first user plane function network element.

* * * * *